United States Patent [19]

Sato et al.

[11] Patent Number: 5,508,616
[45] Date of Patent: Apr. 16, 1996

[54] APPARATUS AND METHOD FOR DETERMINING PARAMETERS OF FORMATIONS SURROUNDING A BOREHOLE IN A PRESELECTED DIRECTION

[75] Inventors: Motoyuki Sato; Hiroaki Niitsuma, both Sindai; Jun Fuziwara, Funaoka-Higashi; Makoto Miyairi, Funabashi, all of Japan

[73] Assignees: Sekiyushigen Kaihatsu Kabushiki Kaisha, Tokyo; Japan as Represented By President of Tohoku University, Sendai, both of Japan

[21] Appl. No.: 150,680

[22] Filed: Nov. 20, 1993

[30] Foreign Application Priority Data

May 31, 1993 [JP] Japan .................... 5-149842

[51] Int. Cl.$^6$ .................................................. G01V 3/28
[52] U.S. Cl. .................................................. 324/343
[58] Field of Search .................... 324/332–334, 324/338–343, 346, 351, 345; 364/422; 367/56–58; 175/45, 50

[56] References Cited

U.S. PATENT DOCUMENTS

| | | | |
|---|---|---|---|
| 1,819,923 | 8/1931 | Schlumberger | 324/366 |
| 1,913,293 | 6/1933 | Schlumberger | 324/351 |
| 2,220,070 | 11/1940 | Aiken | 324/339 |
| 2,220,788 | 11/1940 | Lohman | 324/339 |
| 2,582,314 | 1/1952 | Doll | 324/339 |
| 3,014,177 | 12/1961 | Hungerford et al. | 324/343 |
| 3,067,383 | 12/1962 | Tanguy | 324/339 |
| 3,166,709 | 1/1965 | Doll | 324/339 |
| 3,187,252 | 6/1965 | Hungerford | 324/346 |
| 3,226,633 | 12/1965 | Schneider | 324/339 |
| 3,510,757 | 5/1970 | Huston | 324/343 |
| 3,539,911 | 11/1970 | Youmans et al. | 324/343 |
| 3,561,007 | 2/1971 | Gouilloud et al. | 324/333 |
| 3,808,520 | 4/1974 | Runge | 324/343 |
| 4,302,723 | 11/1981 | Moran | 324/343 |
| 4,360,777 | 11/1982 | Segesman | 324/339 |
| 4,481,472 | 11/1984 | Gianzero | 324/339 |
| 4,513,376 | 4/1985 | Barber | 324/339 X |
| 4,697,190 | 9/1987 | Oswald | 324/338 X |
| 4,933,640 | 6/1990 | Kuckes | 324/343 X |

*Primary Examiner*—Sandra L. O'Shea
*Assistant Examiner*—J. M. Patidar
*Attorney, Agent, or Firm*—Joseph C. Mason, Jr.; Ronald E. Smith

[57] ABSTRACT

At least one transmitting coil 1 and at least one receiving coil 2 are disposed along the bore axis 18 of a borehole 7 such that these coils are inclined and face each other, thus causing these coils to have directivity for examining electric characteristics of a formation around the borehole. More specifically, a method of and an apparatus for directional induction logging are provided, which permit measurement of the electric conductivity distribution of a formation in the circumferential direction in a range of several meters around the borehole and also imaging reflecting the electric conductivity.

6 Claims, 25 Drawing Sheets

F I G. 13
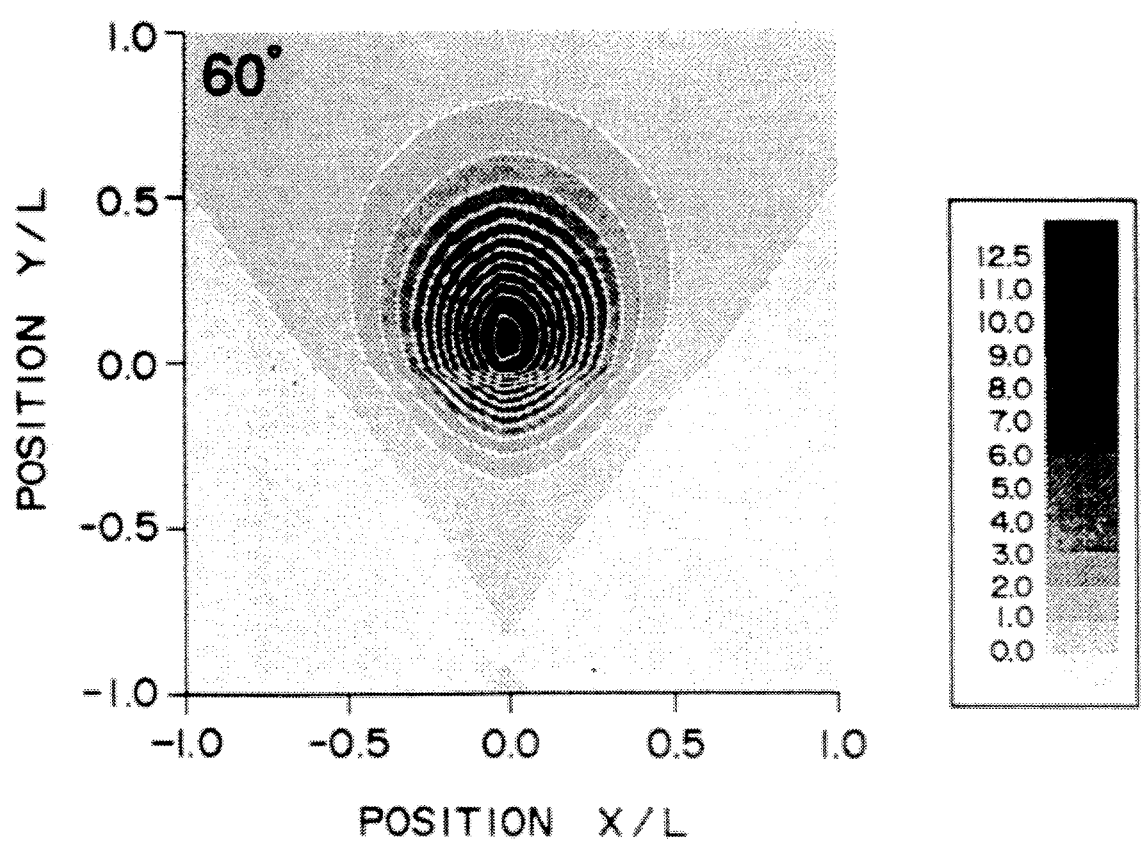

F I G. 24
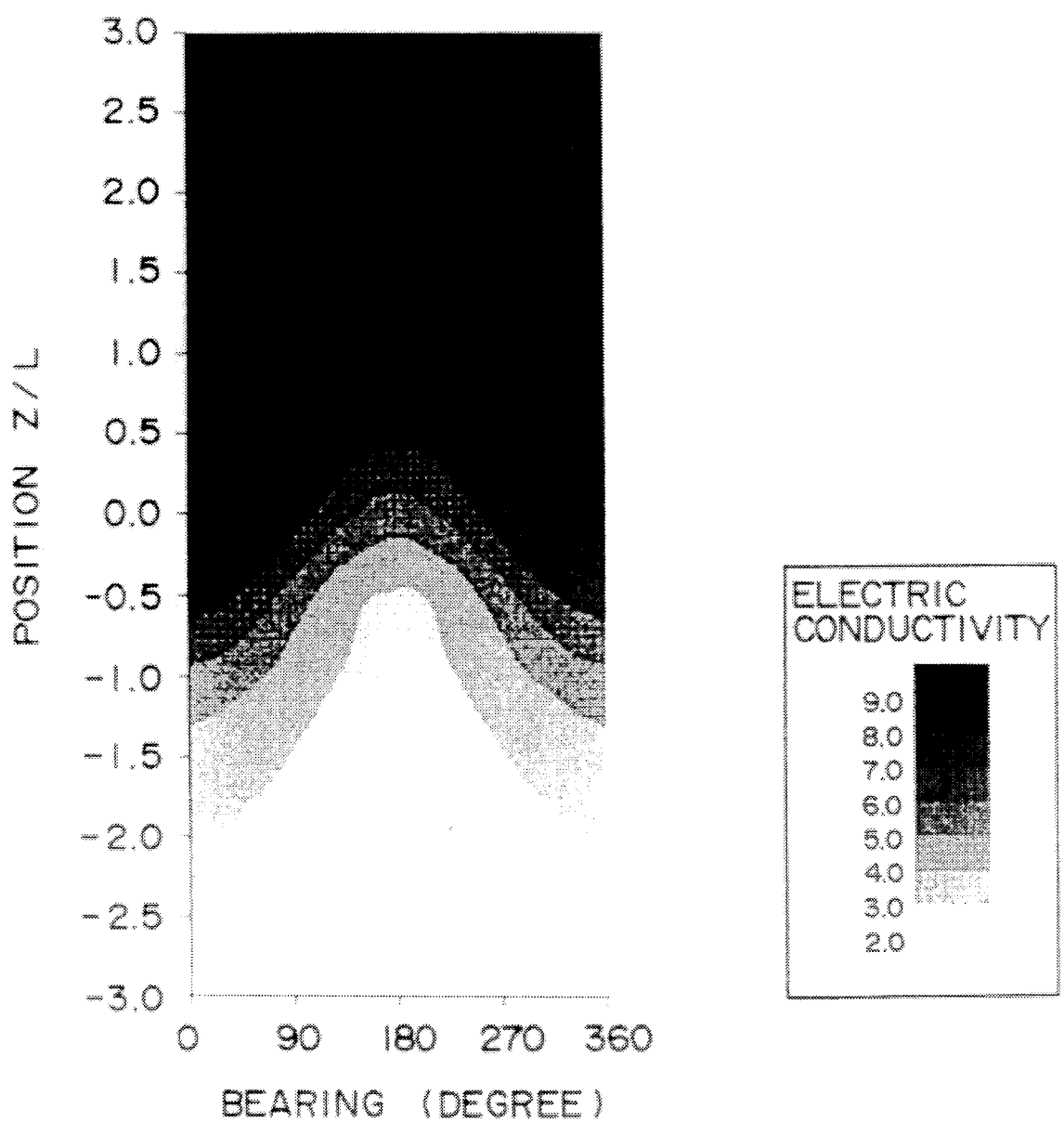

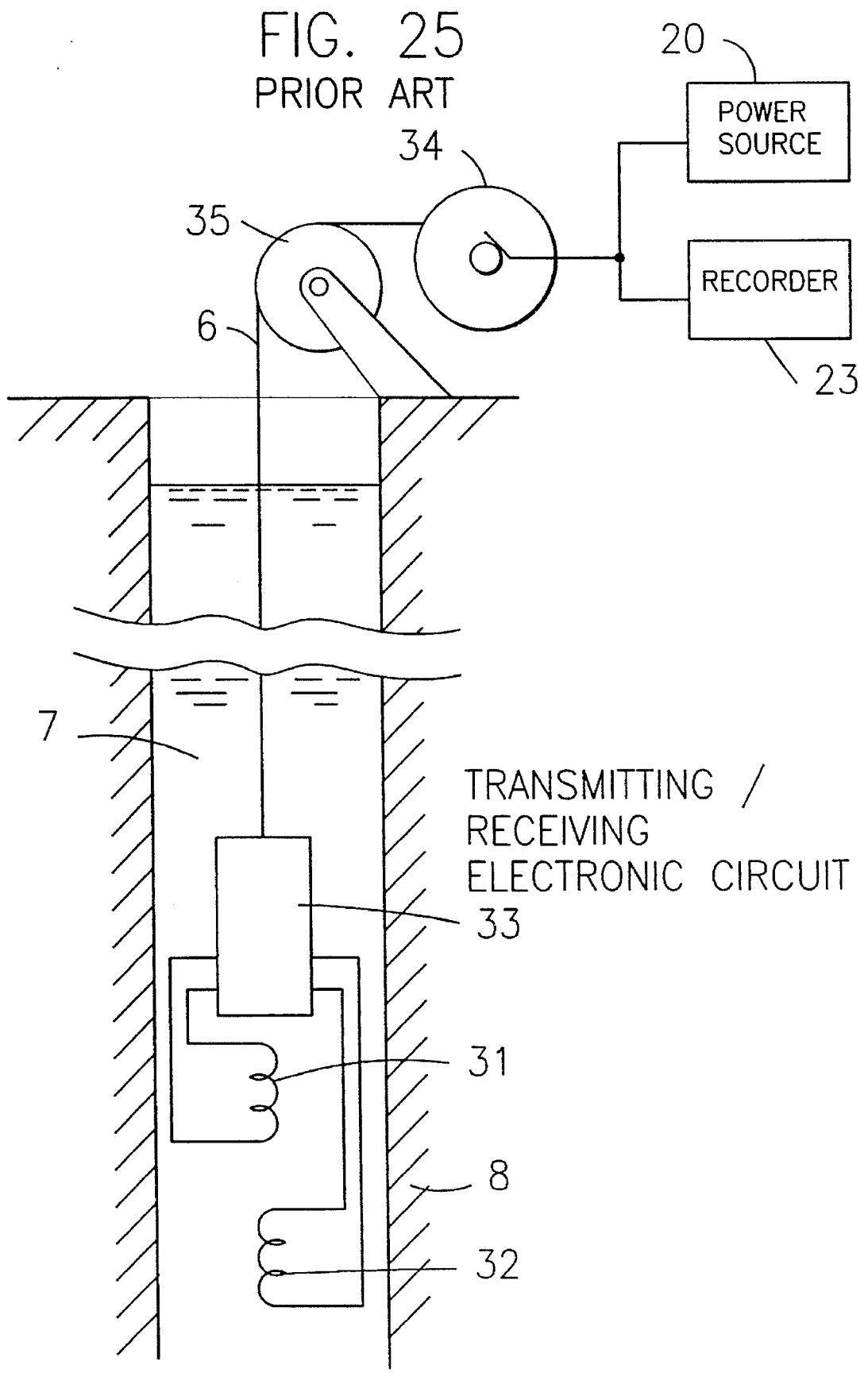

APPARATUS AND METHOD FOR DETERMINING PARAMETERS OF FORMATIONS SURROUNDING A BOREHOLE IN A PRESELECTED DIRECTION

BACKGROUND OF THE INVENTION

1. Field of the Invention

This invention relates to a method of and an apparatus for directional induction logging for obtaining information of formation by measuring electric characteristics of formations by making use of a borehole. The invention is applicable to very extensive fields of utility. Among these fields of utility, those, to which the application is particularly desired, are as follows.

(1) Survey and exploring of petroleum and geothermal reservoirs:

The invention permits imaging of the circumferential distribution of the electric conductivity at depths of boreholes, and is thus effective for the survey and exploring fracture reservoirs and like anisotropic reservoirs.

(2) Measurement sensors in the MWD (Measurement While Drilling) techniques for making measurements during drilling a borehole:

When carried out as a resistivity sensor in the MWD, the invention permits monitoring of upper and lower formations during horizontal drilling or the like. It is thus possible to drill a borehole without departing from a desired formation.

(3) Survey of foundations for the civil and construction purposes:

The invention permits imaging of the circumferential distribution of the electric conductivity at depths of boreholes and is thus effective for the survey of anisotropic foundations.

2. Description of the Prior Art

FIG. 25 basically shows an induction logging apparatus in the prior art, which is composed of transmitting and receiving coils 31 and 32 disposed coaxially in a borehole 7. As indicated in FIG. 2, borehole axis 18 is coincident with axis 19 of the coils. The principles underlying the induction logging apparatus are as follows.

A. A magnetic field is generated by supplying an alternating current to the transmitting coil 31.

B. The generated magnetic field generates an eddy current in a formation 8 around the tool such that the current is substantially proportional to the electric conductivity of the formation 8.

C. The eddy current thus generated generates a magnetic field secondarily. This secondary magnetic field induces a voltage across the receiving coil 32 within the tool.

D. The induced voltage is proportional to the magnitude of the eddy current, i.e., the electric conductivity of the formation 8 surrounding the coils. Thus, it is possible to measure the electric conductivity of the formation 8 by measuring the voltage across the receiving coil 32.

E. Across the receiving coil 32, a voltage is also induced by mutual induction with the transmitting coil 31. This signal, however, is 90 degrees out of phase with respect to the voltage induced in the receiving coil 32 by the eddy current in the formation 8. Thus, this signal and the induced voltage can be separated from each other by use of a phase sensitive detector.

Referring to FIG. 25, designated at a reference numeral 6 is a cable, at a reference numeral 20 a power source, at a reference numeral 23 a recorder, at reference numeral 33 a transmitting/receiving electronic circuit, at reference numeral 34 a winch, and a reference numeral 35 a pulley.

An induction logging apparatus which is actually used at present, has pluralities of coaxially arranged transmitting and receiving coils. However, the basic principles are the same.

Such induction logging apparatus with coaxially arranged transmitting and receiving coils are disclosed in U.S. Pat. Nos. 1,819,923, 1,913,293, 2,220,070, 2,220,788, 2,582, 314, 3,067,383, 3,166,709, 3,226,633, 4,481,472 and 4,513, 376 or the like.

In the induction logging apparatus described above, the sensitivity is fixed in the circumferential direction with respect to the hole axis. Therefore, the apparatus does not have any directivity in the circumferential direction. This means that with the Prior art induction logging apparatus, no information could be obtained about the distribution of the electric conductivity in the circumferential direction of the borehole.

Meanwhile, there have been proposed various induction logging apparatus for specific purpose, for instance, those disclosed in U.S. Pat. Nos. 3,014,177, 3,187,252, 3,510,757, 3,561,007 and 3,808,520.

In any of such special purpose induction logging apparatus, however, an orthogonal coil arrangement is used, and the magnetic field is rotated electrically or mechanically for measuring anisotropic extensions and inclinations of inclined and horizontal formations. Therefore, unlike the present invention, it is impossible to obtain the circumferential electric conductivity distribution around a borehole and obtain imaging of the distribution.

As a substitute for prior art electrodes mounted on dip meter pads, an induction type logging apparatus having asymmetric sensitivity is known, as disclosed in U.S. Pat. No. 3,539,911. In this apparatus, at least two electrically serially connected transmitting coils are disposed in an inclined fashion in a pad, and a receiving coil shaft is disposed between the adjacent transmitting coils such that the shaft is parallel to the hole axis. This apparatus, therefore, is irrelevant in the technical concept to the present invention.

SUMMARY OF THE INVENTION

A first object of the present invention is to provide an arrangement comprising at least one transmitting coil 1 and at least one receiving coil 2, which are disposed along the axis 18 of a borehole 7 such that these coil face each other in an inclined fashion relative to each other and thus are caused to have directivity to permit examination of electric characteristics of the formation around the borehole, thus permitting survey of electric characteristics of the formation in the specific direction and the circumferential direction in a range of several meters around the borehole, which could have not been made with the prior art method.

A second object of the present invention is to provide an arrangement comprising a transmitting coil 1 and a receiving coil 2, which are disposed in a borehole 7 and rotated by a drive device 14 for measuring electric conductivity distribution in the circumferential direction of the borehole, thus permitting measurement of electric conductivity distribution of the formation in the circumferential direction in a range of several meters around the borehole, which could have not been made with the prior art method. It is thus possible to clarify the boundary surface between a reservoir and a different rock that is located at a distance of several meters from the borehole, thus permitting the drilling of a borehole along a thin formation.

A third object of the present invention is to provide an arrangement comprising a transmitting coil 1 and a receiving coil 2, which are disposed in a borehole 7 and rotated by a drive device 14 for continuous measurement of electric conductivity along the hole axis 18, thus permitting imaging of the electric conductivity of a formation 8 around the borehole. It is thus possible to obtain information of the developing direction or the like of reservoirs, which are effective for the survey and exploring fracture reservoirs or like anisotropic reservoirs.

BRIEF DESCRIPTION OF THE DRAWINGS

The foregoing and other objects and features of the invention will become apparent from the following description of preferred embodiments of the invention with reference to the accompanying drawings, in which:

FIG. 13 is a photograph showing an XY-plane sensitivity distribution in case where the coil inclination angle $\Theta_T$ is set to 60°;

FIG. 24 is a photograph showing an embodiment of imaging of theoretical response passing through the inclined boundary surface when the boundary surface angle is 60°; and FIG. 25 is a schematic representation of a set-up for carrying out a prior art method of induction logging.

DETAILED DESCRIPTION OF THE PREFERRED EMBODIMENTS

Figure 1:
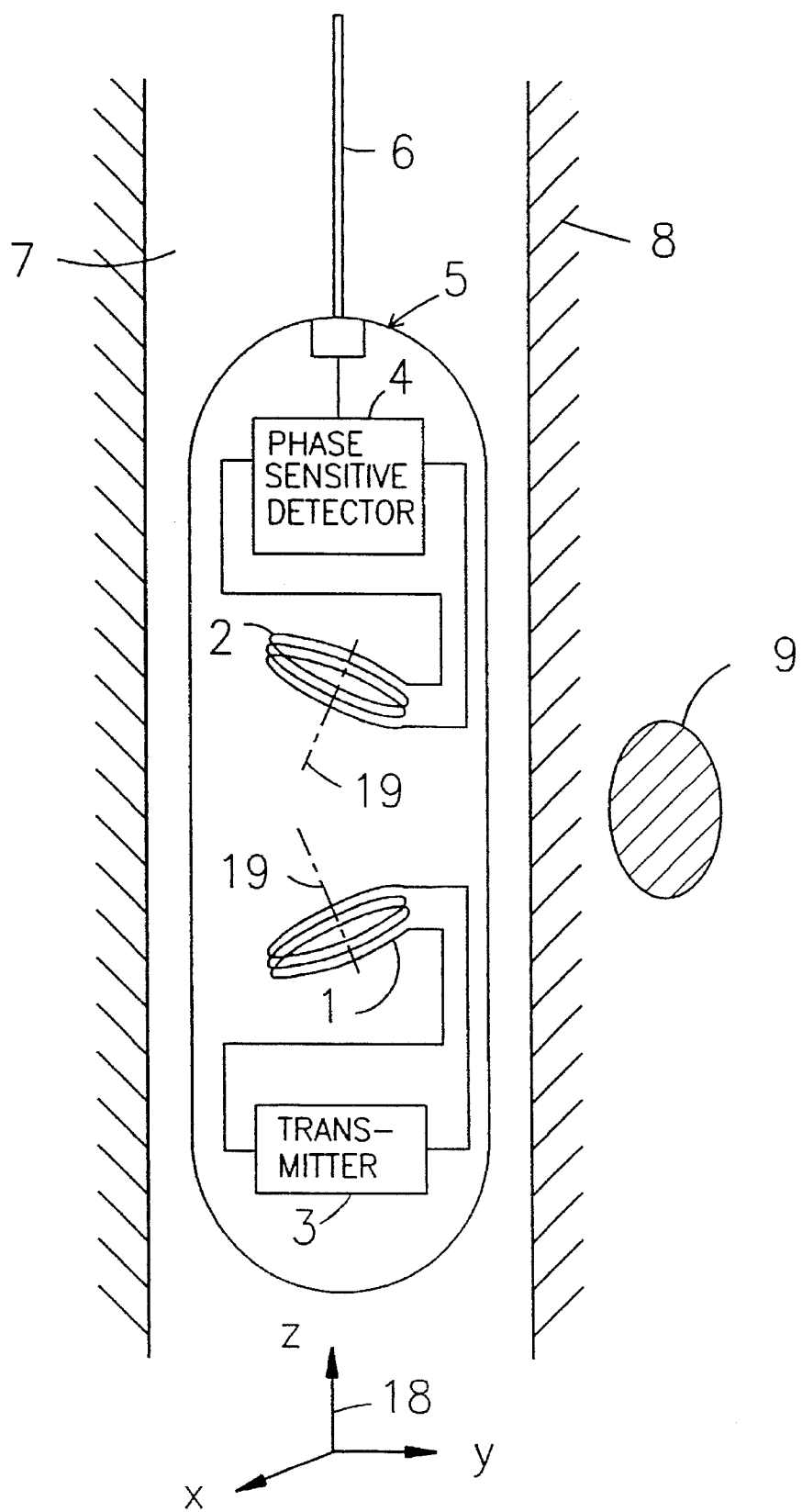
FIG. 1 is a side view, partly in section, for explaining a method of directional induction logging as an embodiment of the present invention.

The present invention concerns a method of and an apparatus for directional induction logging of formations around a borehole 7. More specifically, the present invention concerns a method of and an apparatus for directional induction logging with an aim of measuring the electric conductivity of a formation in a particular direction with respect to the circumference of a borehole.

In the method and apparatus according to the present invention, at least one transmitting coil 1 and at least one receiving coil 2 (both of which have an axis denoted 19 in FIGS. 1, 3, 5, 15, and 20) are disposed in a borehole 7 and along the axis 18 thereof in an inclined fashion such that these coils face one another and thus are caused to have directivity provided for examining electric characteristics of a formation around the borehole.

Figure 20:
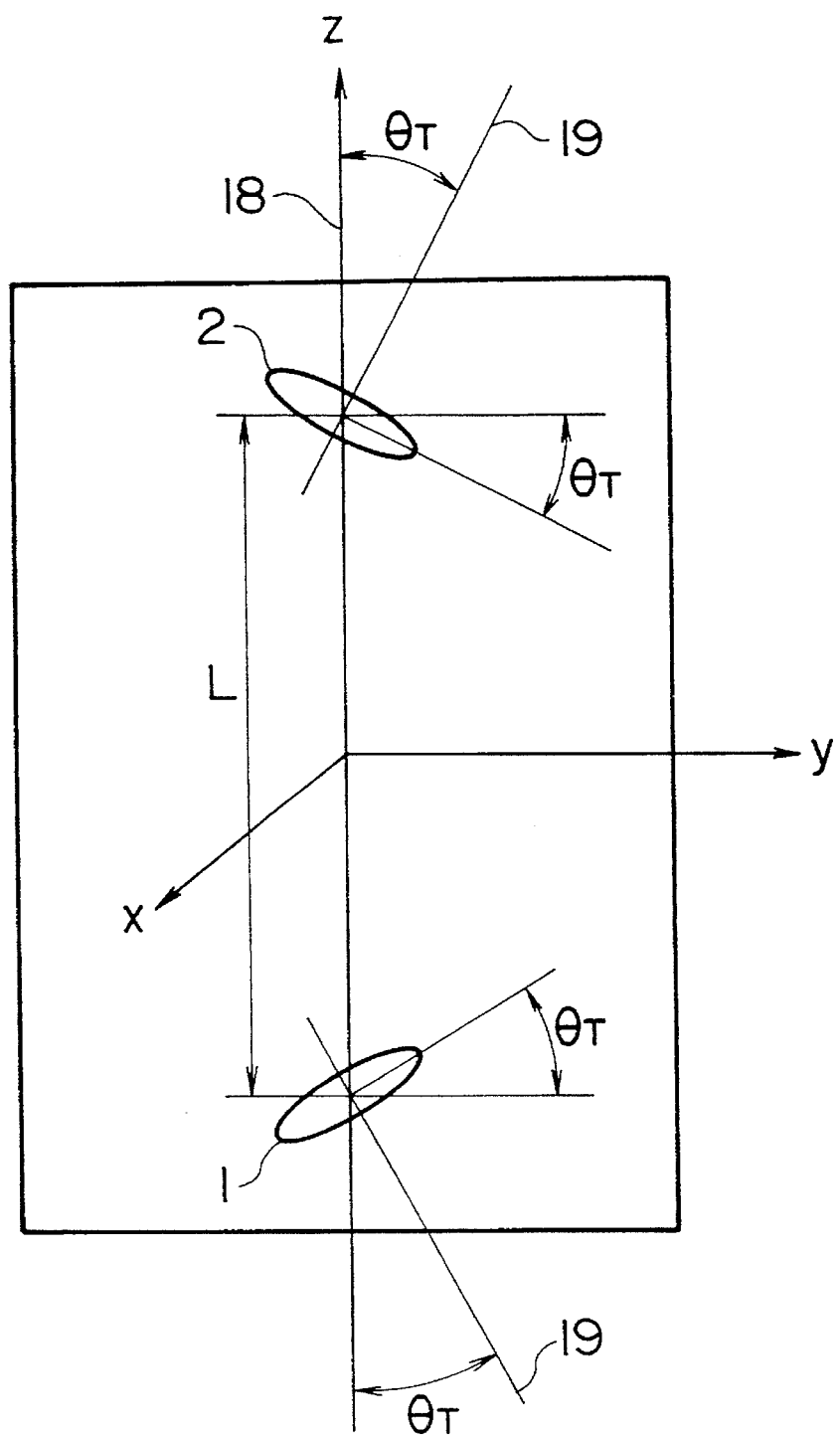
FIG. 20 is a view illustrating the direction and the plane in FIGS. 16 to 19.

Specifically, as shown in FIG. 20, the transmitting and receiving coils 1 and 2 are disposed such that the axes of these coils are inclined by an inclination angle $\Theta_T$ while these coils face each other.

With this arrangement, directivity can be obtained in the directions P (FIG. 4) of inclination, in which the coils face each other.

Further, the transmitting and receiving coils 1 and 2 are rotated in the borehole 7 by a drive device 14 (FIGS. 5 and 6) for measuring the electric conductivity around the borehole.

Further, the electric conductivity is measured continuously along the hole axis by rotating the transmitting and receiving coils 1 and 2 in the borehole by the drive device 14.

FIG. 1 schematically shows an induction logger 5 as an embodiment of the present invention. According to the present invention, at least one transmitting coil 1 and at least one receiving coil 2 are disposed in the borehole 7 and along the axis 18 thereof in an inclined fashion (with inclination angle $\Theta_T$ of desirably about 30°) such that these coils face each other. An alternating current is supplied to the transmitting coil 1 from a transmitter 3 to generate a magnetic field, thus generating an eddy current substantially proportional to the electric conductivity in the surrounding formation 8. The eddy current generates a secondary magnetic field which is measured with the receiving coil 2.

The amplitude of the voltage induced across the receiving coil 2 and the phase difference with respect to the current supplied to the transmitting coil 1 are measured by a phase sensitive detector 4 to be transmitted via a cable 6 to the ground surface for recording with well-known recording means. With the inclination of the transmitting and receiving coils 1 and 2 in one direction, there is formed a place 9 of concentration of eddy current generation, and thus it is possible to measure only the electric conductivity in a particular direction.

Further, by mechanically causing rotation of the coil pair in this arrangement, it is possible to measure the electric conductivity around the borehole.

Further, by raising and lowering the pair of transmitting and receiving coils 1 and 2 in this arrangement along the hole axis while mechanically rotating the coil pair, it is possible to obtain imaging reflecting the electric conductivity of formations at depths along the borehole.

Now, directivity characteristic and optimum inclination angle by computer simulation will be described.

Figure 2:
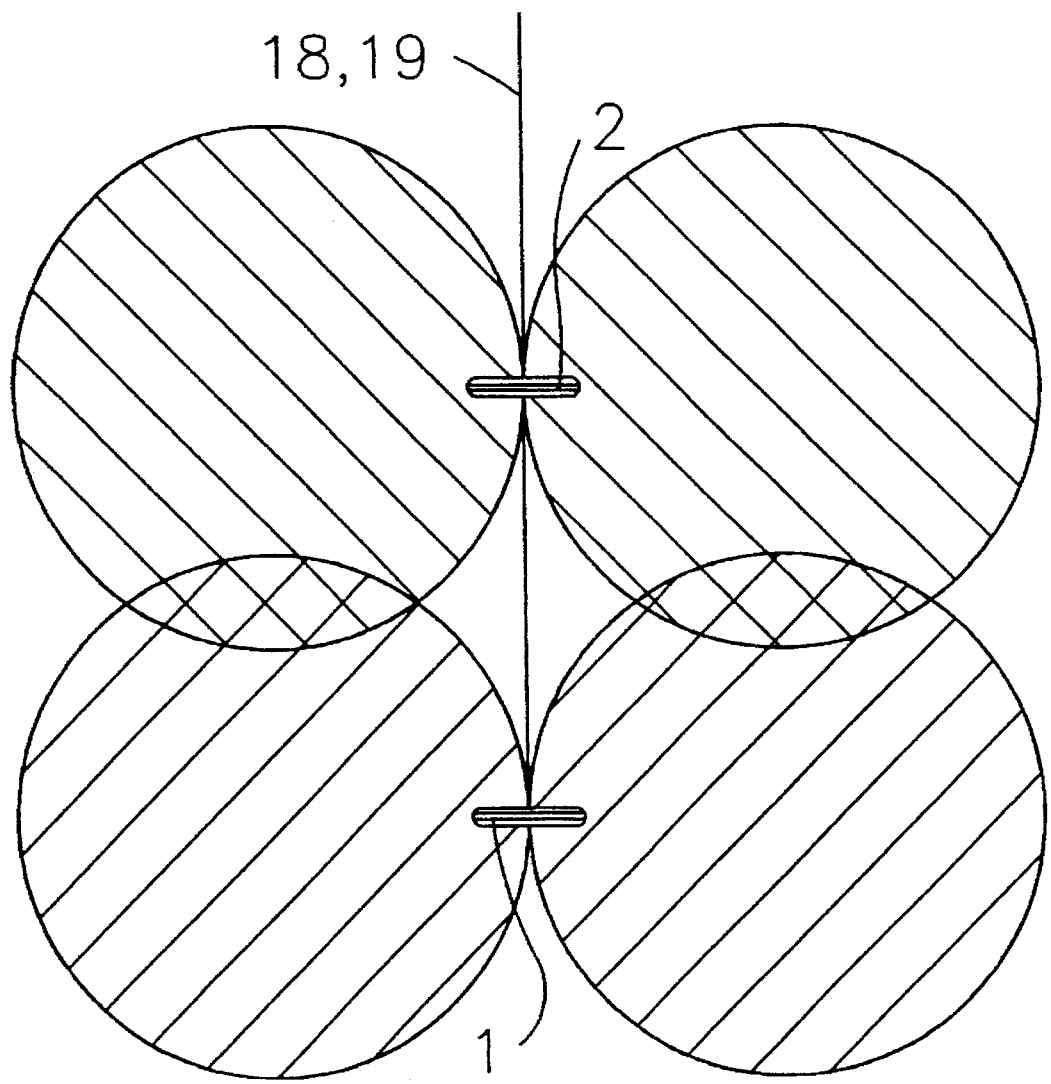
FIG. 2 is a view illustrating the directivity synthesis with a prior art coaxial coil arrangement.
Figure 3:
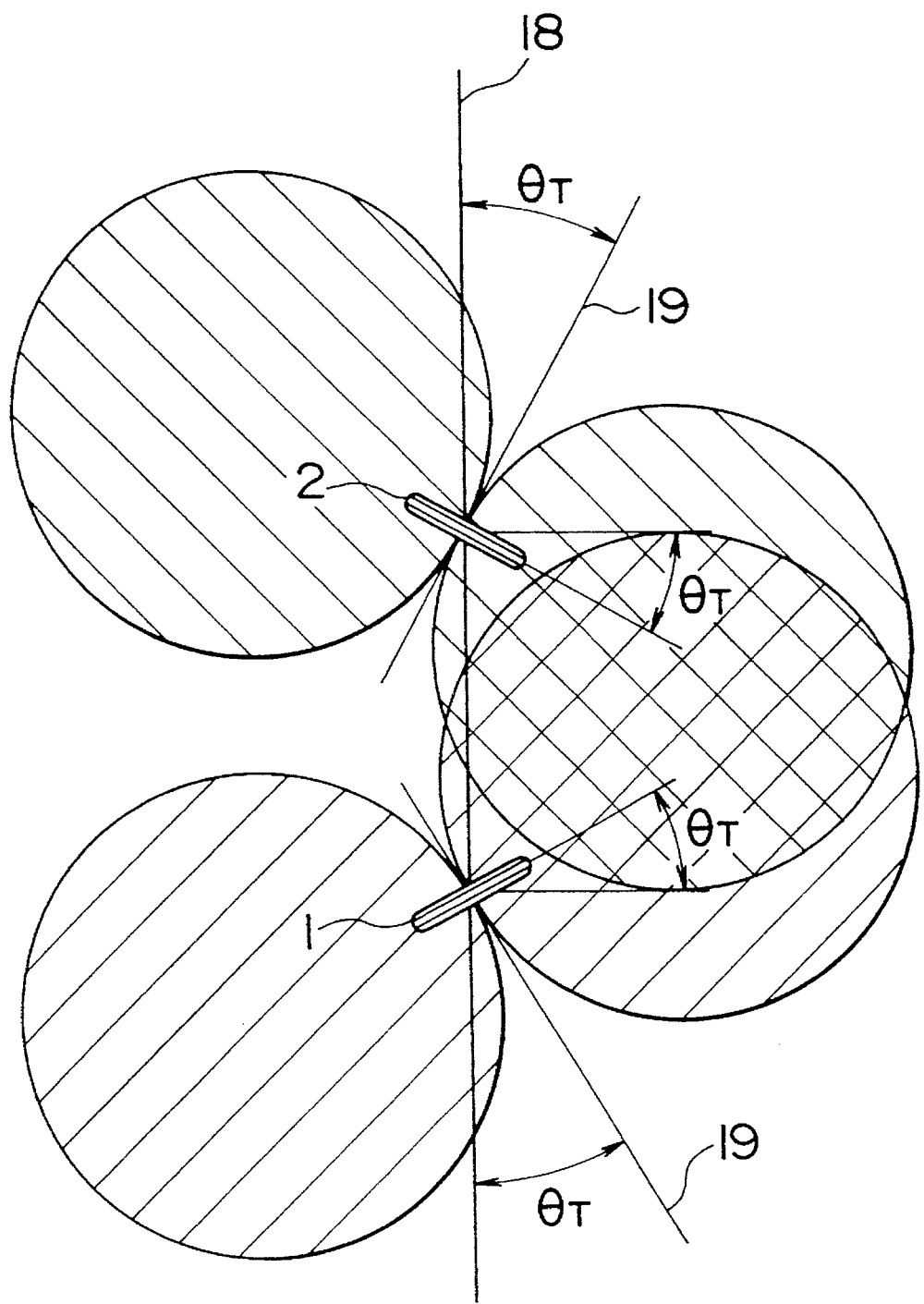
FIG. 3 is a view illustrating the directivity synthesis with an inclinedly arranged coil arrangement according to the present invention.

The eddy current generated by the transmitting coil 1 flows coaxially in a plane parallel to the transmitting coil 1. Its intensity distribution is outlined in FIGS. 2 and 3. The sensitivity distribution with respect to the eddy current generated by the receiving coil 2 is, from the reversible theorem of the electromagnetic field, equal to the eddy current distribution formed by the transmitting coil 1. Thus, the sensitivity of the induction type logger is the integral of the overlapped area of the sensitivity distributions formed by the transmitting and receiving coils 1 and 2 as shown in FIGS. 2 and 3. With the coaxial arrangement in the prior art (FIG. 2), its distribution is symmetrical with respect to the hole axis 18.

In contrast, with the inclined arrangement according to the present invention (FIG. 3), the sensitivity area is limited to be in one direction with respect to the circumference of the hole axis. Thus, it is possible to realize the directivity. FIGS. 11 to 20 show results of theoretical calculation of the variation of sensitivity distribution in the planes normal to and including the hole axis 18 for various inclination angles $\Theta_T$ of the transmitting and receiving coils 1 and 2. From FIGS. 11 to 20, it is found that an appropriate inclination angle $\Theta_T$ of the transmitting and receiving coils 1 and 2 is in the neighborhood of 30°.

Now, the verification of the directivity characteristics by model experiments will be described.

Figure 4:
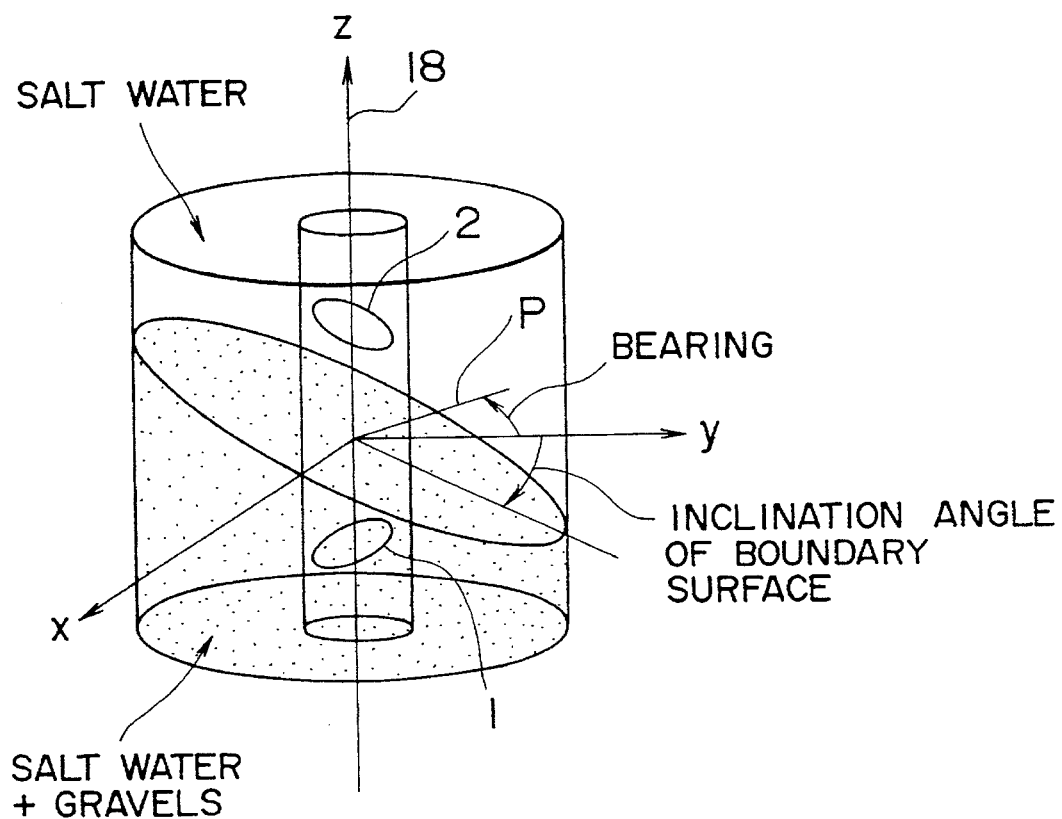
FIG. 4 is a view showing an experimental model of inclined boundary surface.
Figure 21:
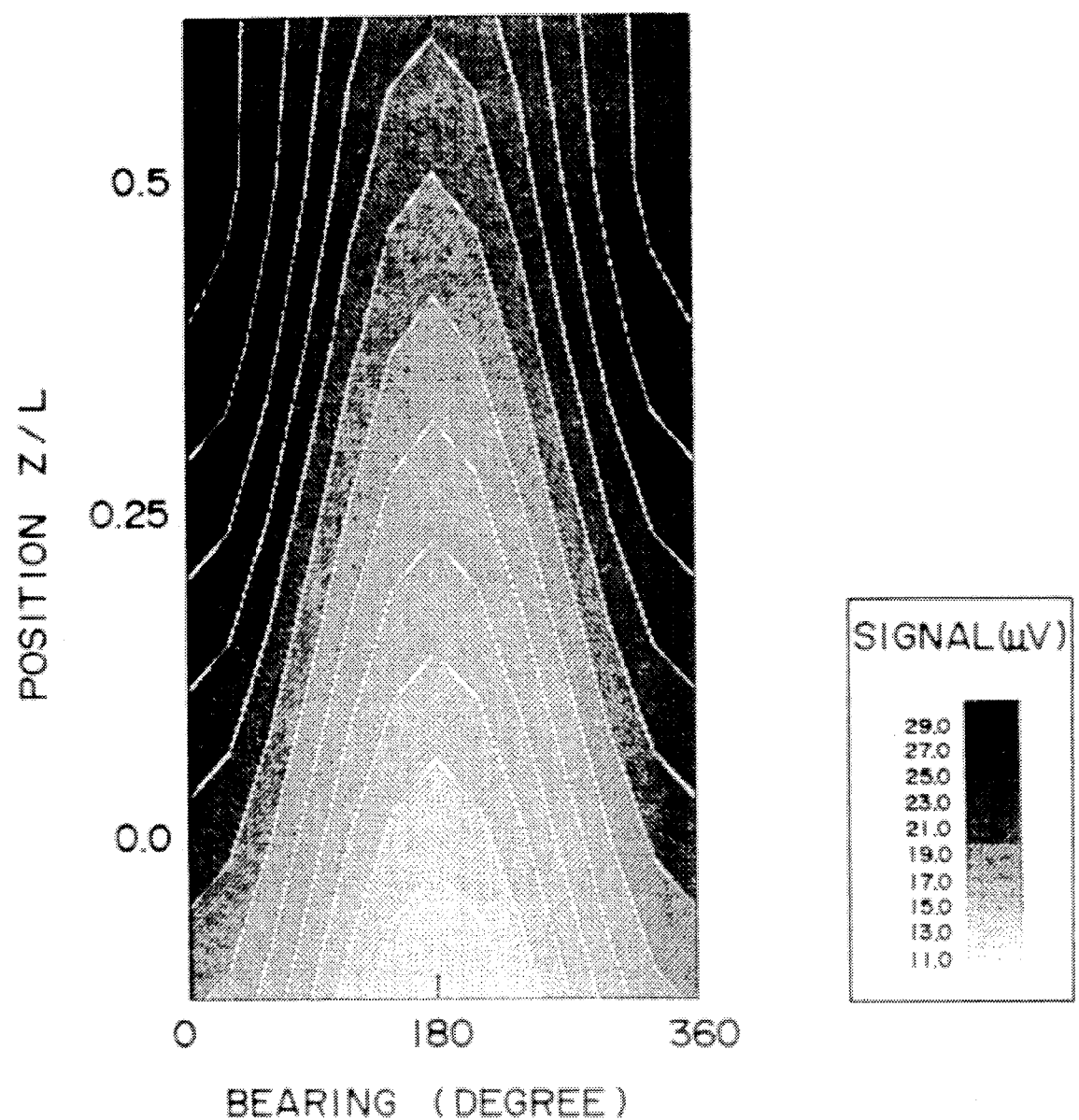
FIG. 21 is a view showing theoretical values representing response in an inclined boundary surface when the boundary surface inclination angle is 45°.
Figure 22:
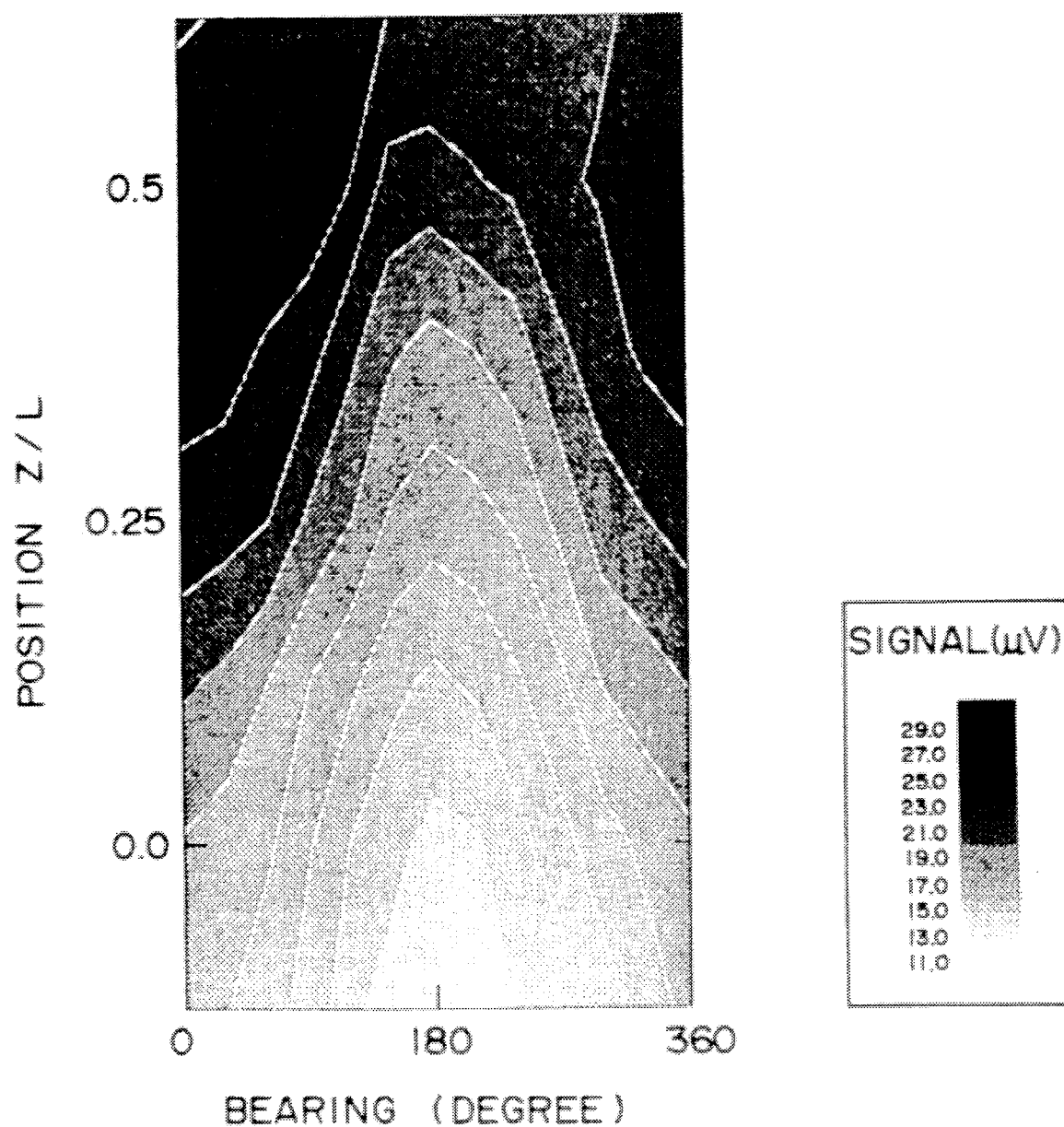
FIG. 22 is a view showing experimental values representing response in the inclined boundary surface when the boundary surface inclination angle is 45°.

To verify the directivity characteristics in the case of the present invention, the response in the case of the present invention was obtained in computer simulation and indoor experiments by using an experimental model simulating a boundary surface between formations of different electric conductivities as shown in FIG. 4 (the upper formation being of a medium with a high electric conductivity, the lower formation being of that with a low electric conductivity). FIGS. 21 and 22 show shade representation and contour representation of the response intensity with respect to the hole axis position and the bearing with the Y axis of the direction P, in which the transmitting and receiving coils 1 and 2 inclined such as to face each other are directed, as reference. FIG. 21 shows theoretical values obtained by computer simulation, and FIG. 22 shows experimental values.

The theoretical and experimental values well coincided, and the response obtained was proportional to the electric conductivity in the direction P, in which the transmitting and receiving coils 1 and 2 inclined such as to face each other are directed. It was thus confirmed that according to the present invention, it is possible to know the circumferential electric conductivity distribution.

Now, imaging will be described.

Figure 23:
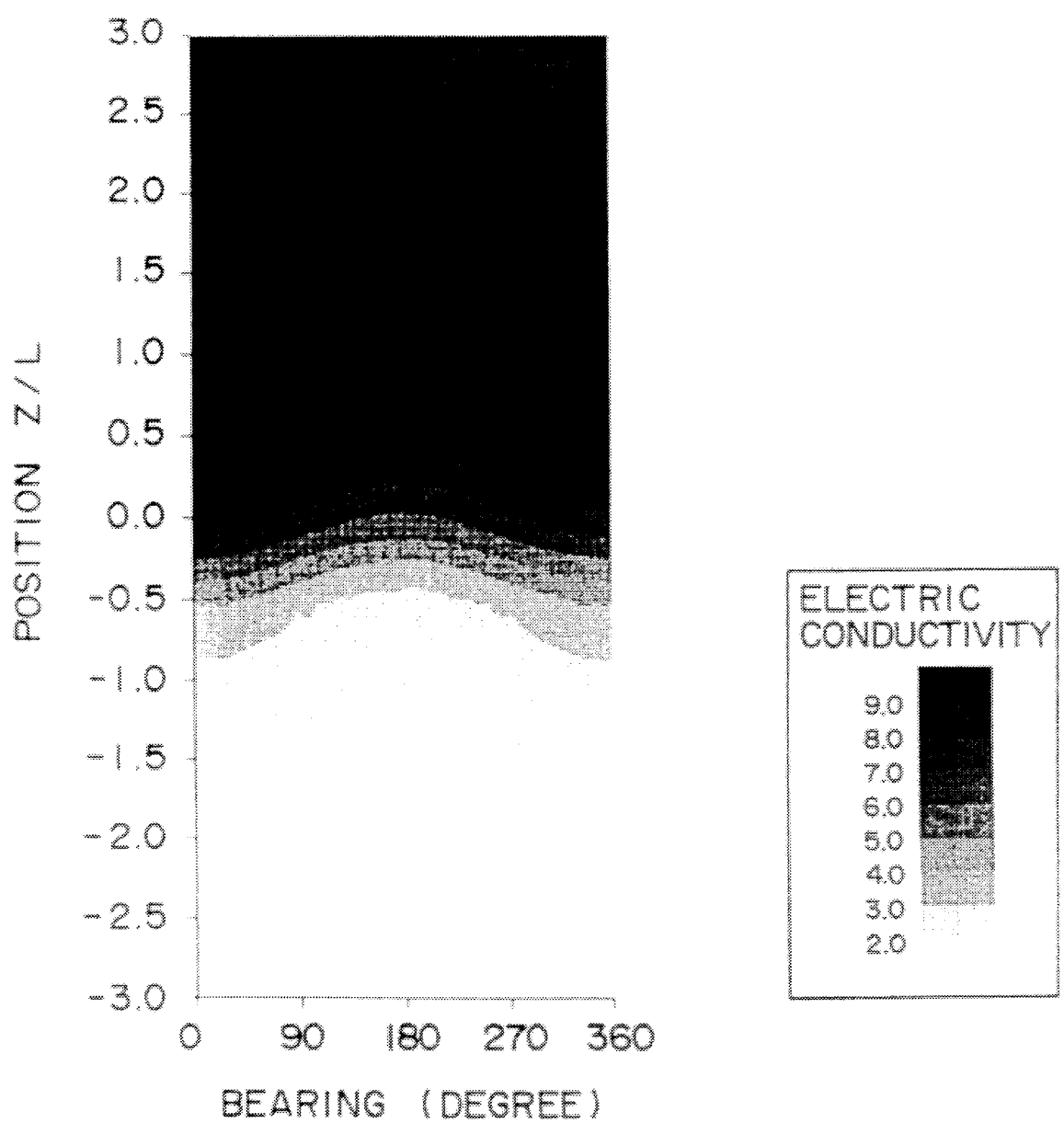
FIG. 23 is a photograph showing an embodiment of imaging of theoretical response passing through the inclined boundary surface when the boundary surface angle is 30°.

Imaging of the electric conductivity configuration inside the hole surface can be obtained by raising and lowering the coil unit, which has the inclined transmitting and receiving coils 1 and 2 such as to face each other, while rotating the unit. FIGS. 23 and 24 show embodiments of imaging of the inclined boundary surface model as shown in FIG. 4 in cases where the inclination angle is 30° and 60°, which obtained with the apparatus according to the present invention.

These embodiments of imaging are shading representations of the measured apparent electric conductivity with respect to the hole axis position and the bearing of the direction, in which the transmitting and receiving coils 1 and 2 inclined such as to face each other are directed. The images represent the electric conductivity distributions inside the hole surface obtained by developing longitudinal divisions of the borehole. In the images, the boundary surface is a curve resembling a sinusoidal curve, and it will be seen that the greater the inclination angle of the boundary surface is, the greater the amplitude of the curve is.

As similar imaging systems or tools, there are a borehole acoustic imaging tool (for instance BHTV), which permits imaging of the intensity of reflected supersonic waves from the borehole surface, and a borehole resistivity imaging tool (for instance FMI), which permits imaging of the resistivity distribution in the borehole surface. These tools or systems, however, permit imaging of only the borehole surface. In contrast, according to the present invention, it is possible to permit imaging of the inside of the borehole surface. Thus, according to the present invention, not only effective measurement can be obtained, but also it is possible to know the internal formation structure which does not appear on the borehole surface even in such environments as where the BHTV or FMI noted above can not be used due to muddy borehole wall or muddy water intrusion areas.

Figure 5:
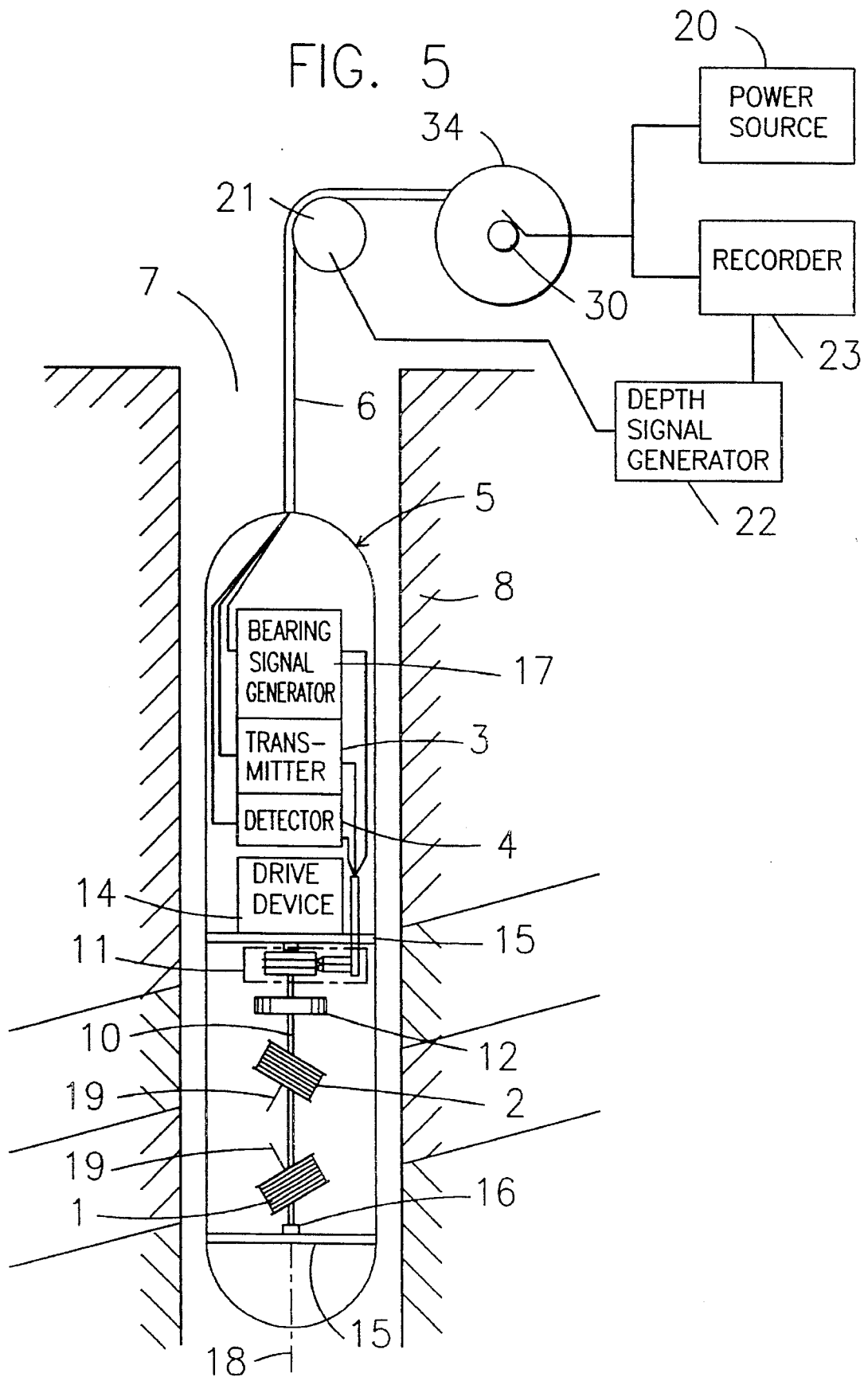
FIG. 5 is a side view, partly in section, showing a first embodiment of the present invention.
Figure 6:
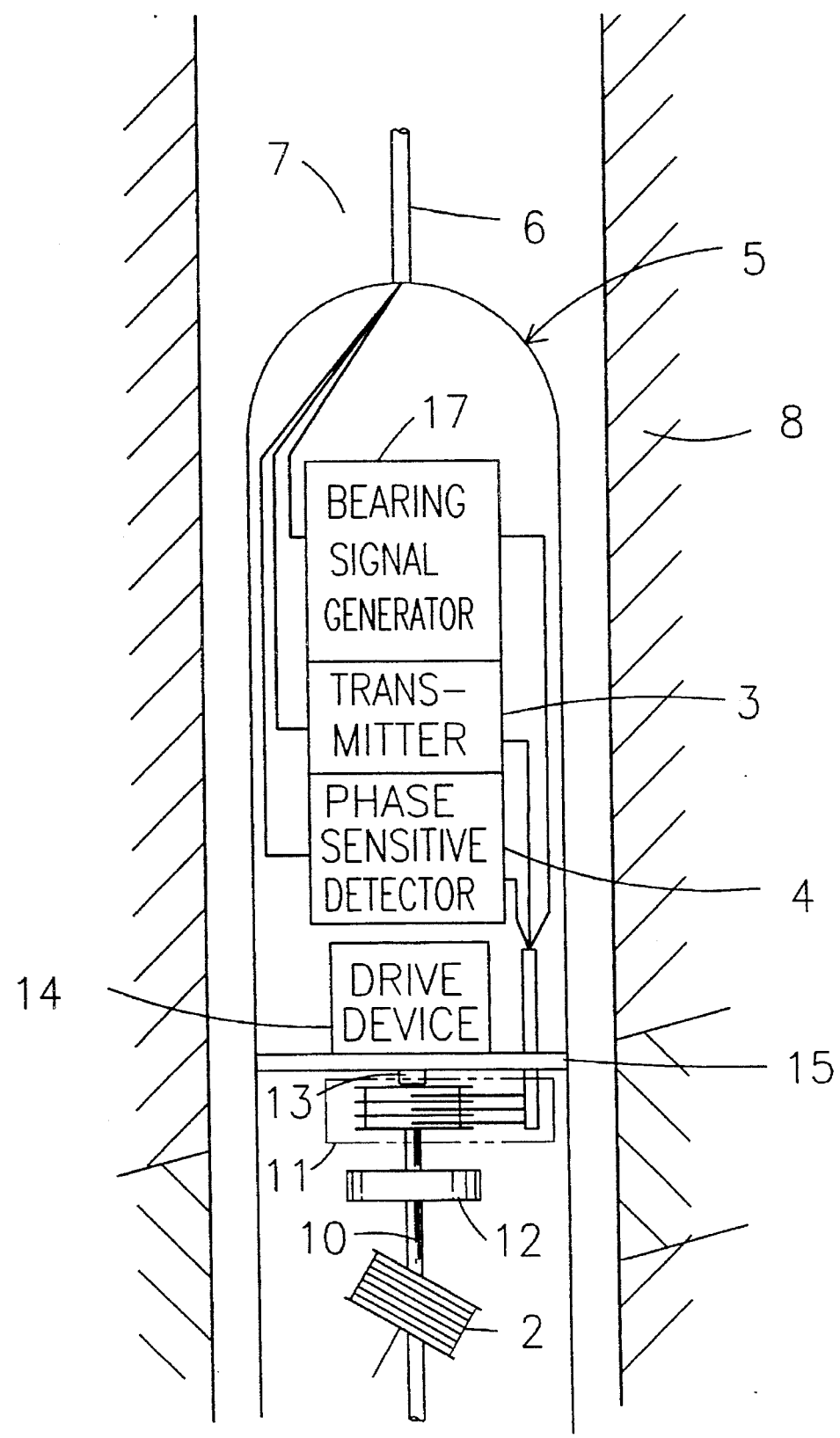
FIG. 6 is an enlarged-scale side view, partly in section, showing a portion of FIG. 5.

FIGS. 5 and 6 show a first embodiment of the present invention. This embodiment concerns a method and an apparatus for imaging the electric conductivity (i.e., electric characteristics) of formations at depths of a borehole.

In this embodiment, in a borehole 7, at least one transmitting coil 1 and at least one receiving coil 2 are secured to a shaft 10 extending along the hole axis 18 such that these coils are inclined (with an inclination angle $\Theta_T$ most desirably about 30°) so as to face each other. A bearing gauge 12 is secured to the shaft 10.

Leads from the transmitting and receiving coils 1 and 2 and the bearing gauge 12 are connected through a slip ring 11 to the transmitter 3, the phase sensitive detector 4 and a bearing signal generator 17, respectively.

The transmitter 3, the phase sensitive detector 4 and the bearing signal generator 17 may be secured to a shaft, and output and power source lines may be led through the slip ring 11 to the ground surface.

In this embodiment, the signal and power source lines are connected through a slip ring 30 in a winch 34 to a power source 20 and a recorder 23. A depth signal, which is produced by a pulley 21 for supporting a cable 6 and provided with a rotary encoder and a depth signal generator 22, is also input to the recorder 23.

The shaft 10 is connected by a connector 13 (FIG. 6) to a drive device 14 comprising a motor. The drive device 14 rotates the shaft 10 at a constant speed.

An alternating current is supplied from the transmitter 3 to the transmitting coil 1, and the amplitude and phase of a voltage induced across the receiving coil 2 are detected by the phase sensitive detector 4 and transmitted via the cable 6 to the ground surface. The bearing signal generator 17 produces a signal corresponding to the bearing from the signal from the bearing gauge 12 and transmits the produced signal via the cable 6 to the ground surface.

The apparatus is moved continuously along the hole axis 18 by moving the cable 6 while mechanically rotating the shaft 10, so that the amplitude and phase of the voltage across the receiving coil 2 in the bearing P, in which the inclined transmitting and receiving coils 1 and 2 facing each other are directed, are recorded along with the depth information in the recorder 23 for imaging. In the imaging method, the electric conductivity is calculated by a well-known method from the amplitude and phase of the voltage across the receiving coil 2, for instance, and is displayed as a shading display on a two-dimensional image plane by taking one of the perpendicular axes for the depth and the other axis for the bearing P, in which the inclined coils facing each other are directed. In this way, an image reflecting the electric conductivity of formations at depths deeper than the borehole can be obtained.

The drive device 14 is secured to a support member 15 provided in an intermediate portion of the logger 5. The upper end of the shaft 10 is connected to the output shaft of the drive device 14 and the lower end thereof is secured to another support member 15 provided in a lower portion of the logger 5.

Figure 7:
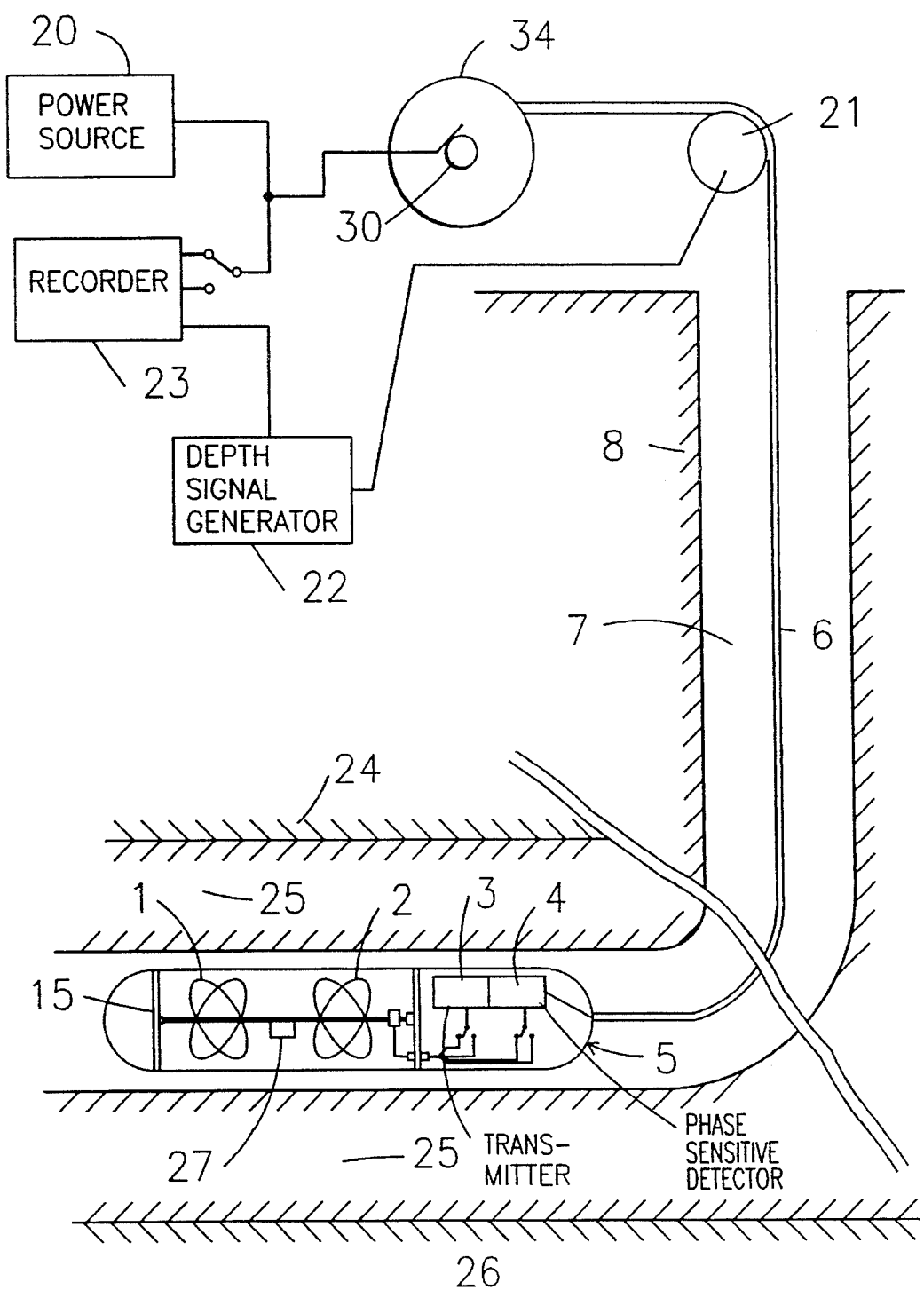
FIG. 7 is a schematic representation of a second embodiment of the present invention.
Figure 8:
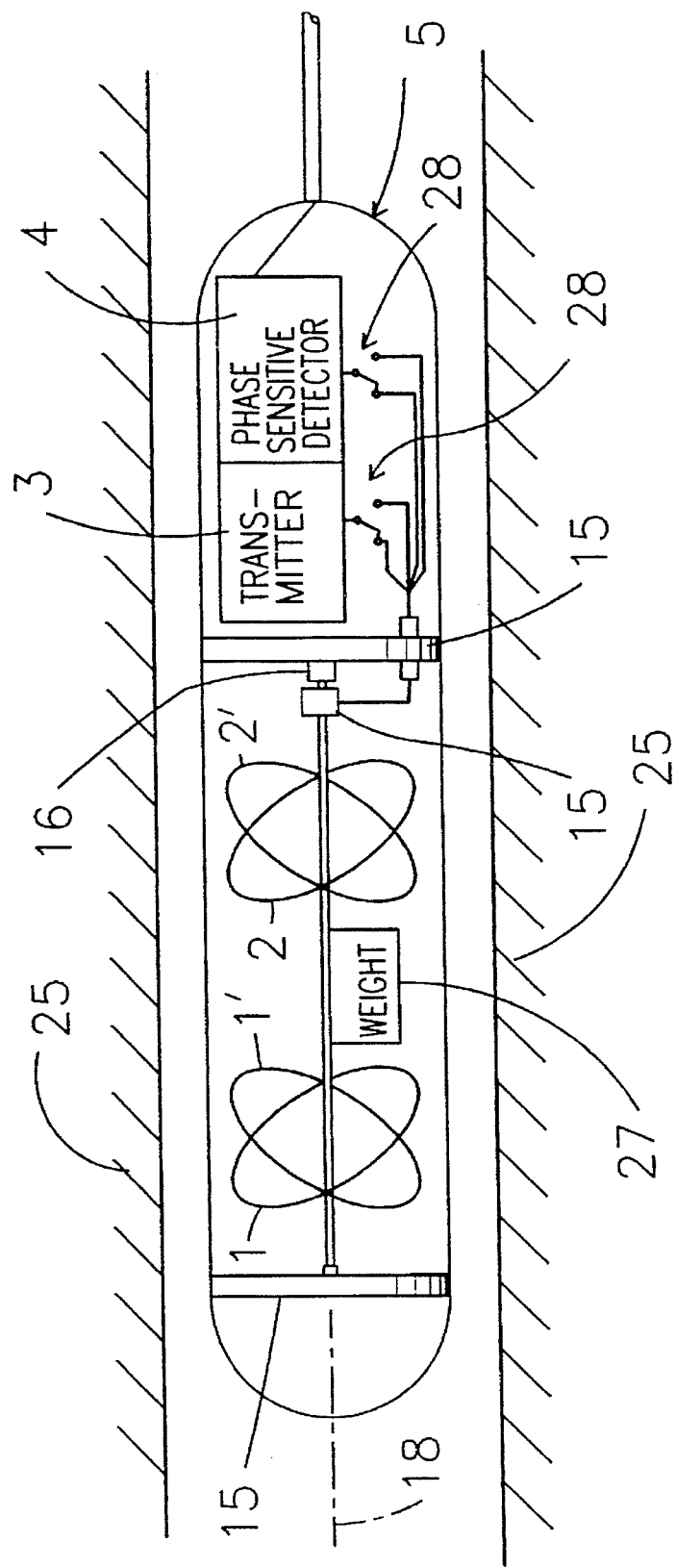
FIG. 8 is an enlarged-scale side view showing a portion of FIG. 8.

FIGS. 7 and 8 show a second embodiment of the present invention. This embodiment is applied to a survey apparatus for drilling a horizontal borehole 7 or the like in a desired formation while monitoring the upper and lower formations 24 and 26 thereof.

In this embodiment, at least one transmitting coil 1 and at least one receiving coil 2 are secured to a shaft 10 extending along the hole axis 18 of the borehole 7 such that these coils are inclined (at an inclination angle $\Theta_T$ of desirably about 30°) so as to face each other. Further, another transmitting coil 1' and another receiving coil 2' (FIG. 8) similar to and in 180-degree symmetry with respect to the transmitting and receiving coils 1 and 2, are also secured to the shaft 10. A weight 27 is secured to the shaft 10 such that either pair of the transmitting and receiving coils are directed to the weight. The weight is rotatably supported by bearings 16 for supporting the shaft such that one of the pairs of the transmitting and receiving coils is directed in the gravitational direction at all times.

The leads from the transmitting coils 1 and 1' and the receiving coils 2 and 2' are connected through a slip ring 11 and switches 28 to the transmitter 3 and the phase sensitive detector 4.

The transmitter 3, the phase sensitive detector 4 and the switches 28 may be secured to the shaft 10 and the output and power supply lines may be connected through the slip ring 11 to the ground surface.

An alternating current is supplied from the transmitter 3 through the switches 28 to the transmitting coils 1 and 1', and the amplitude and phase of the voltage induced across the receiving coils 2 and 2' are detected by the phase sensitive detector 4 through the switch 28 thereof and transmitted via the cable 6 to the ground surface for separation through a switch 29 (FIG. 7) synchronized to the switches 28 and recording on the recorder 23.

This apparatus permits measurement of the electric conductivity on the gravity side of the borehole and the opposite side thereof. When this apparatus is applied to examination of a horizontal borehole, if there is a difference in the electric conductivity between the upper and lower formation 24 and 26 of the intended formation 25, it is possible to know whether the borehole is getting out of the intended formation or whether the borehole is close to the upper or lower formation.

Further, when the apparatus is applied to a sensor for MWD (Measurement While Drilling), it constitutes a navigation tool for drilling a borehole without getting out of the intended formation. Part of the apparatus that is on the ground surface is the same as in the first embodiment.

Figure 9:
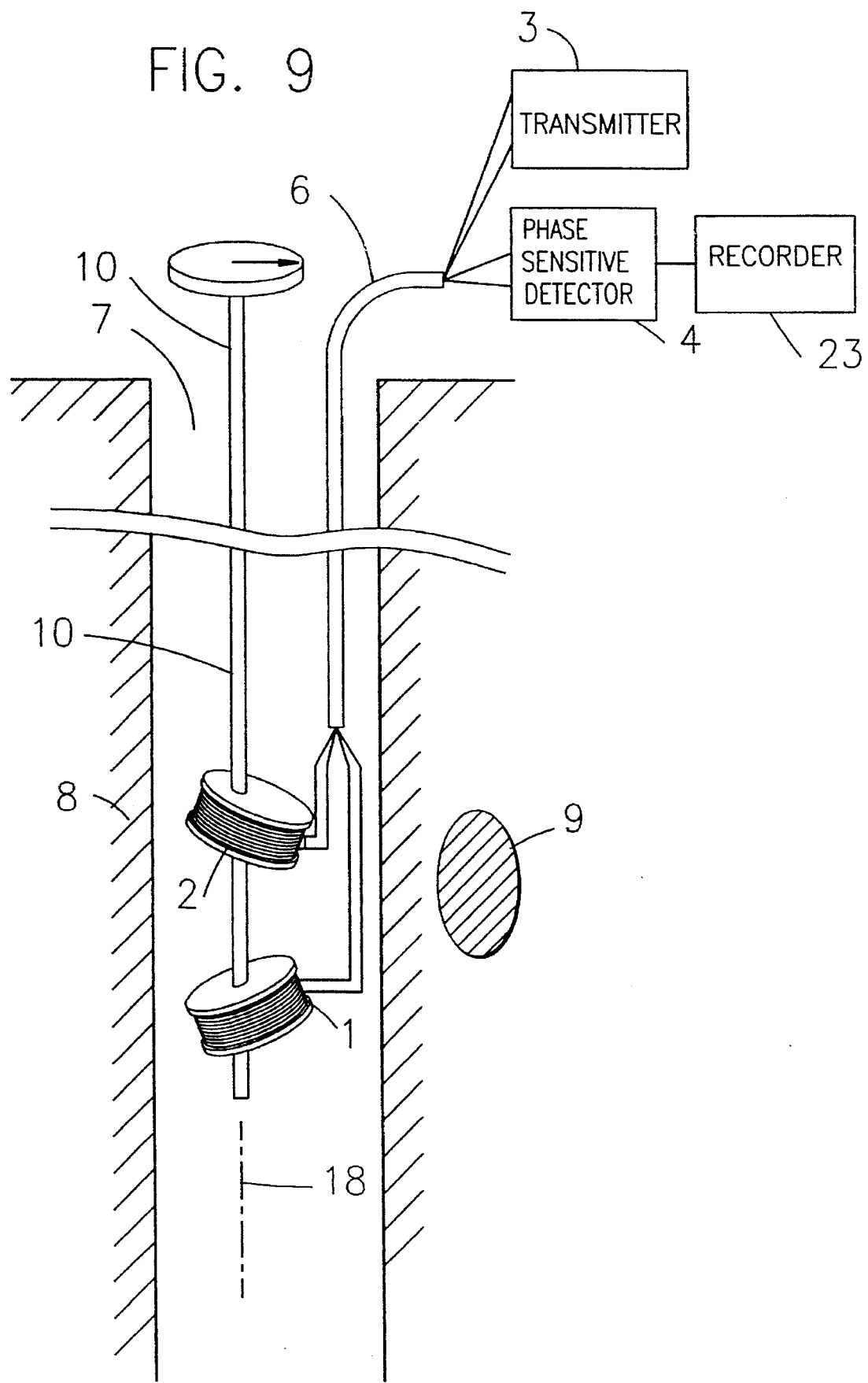
FIG. 9 is a schematic representation of a third embodiment of the present invention.
Figure 10:
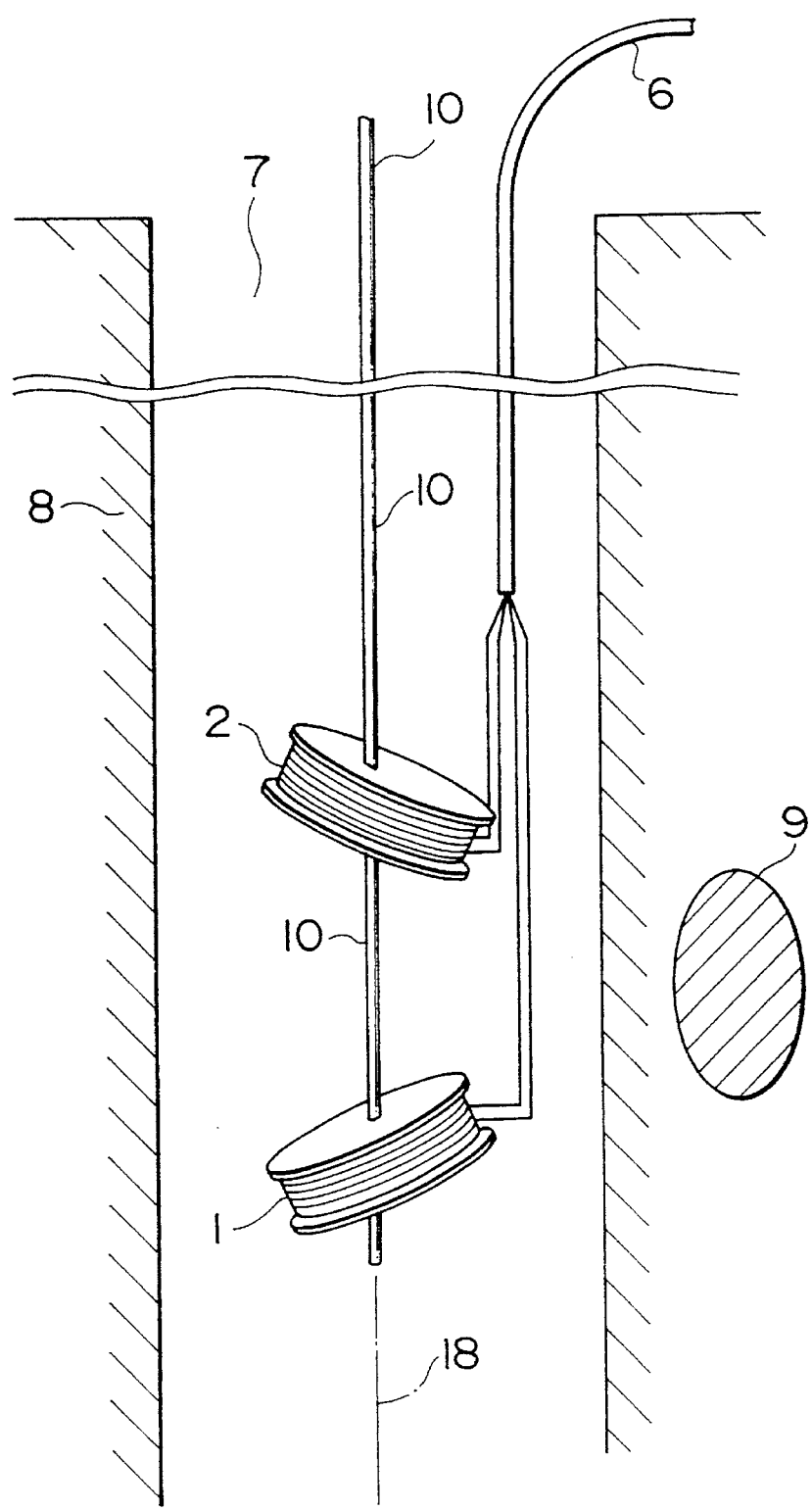
FIG. 10 is an enlarged-scale side view showing a portion of FIG. 9.
Figure 11:
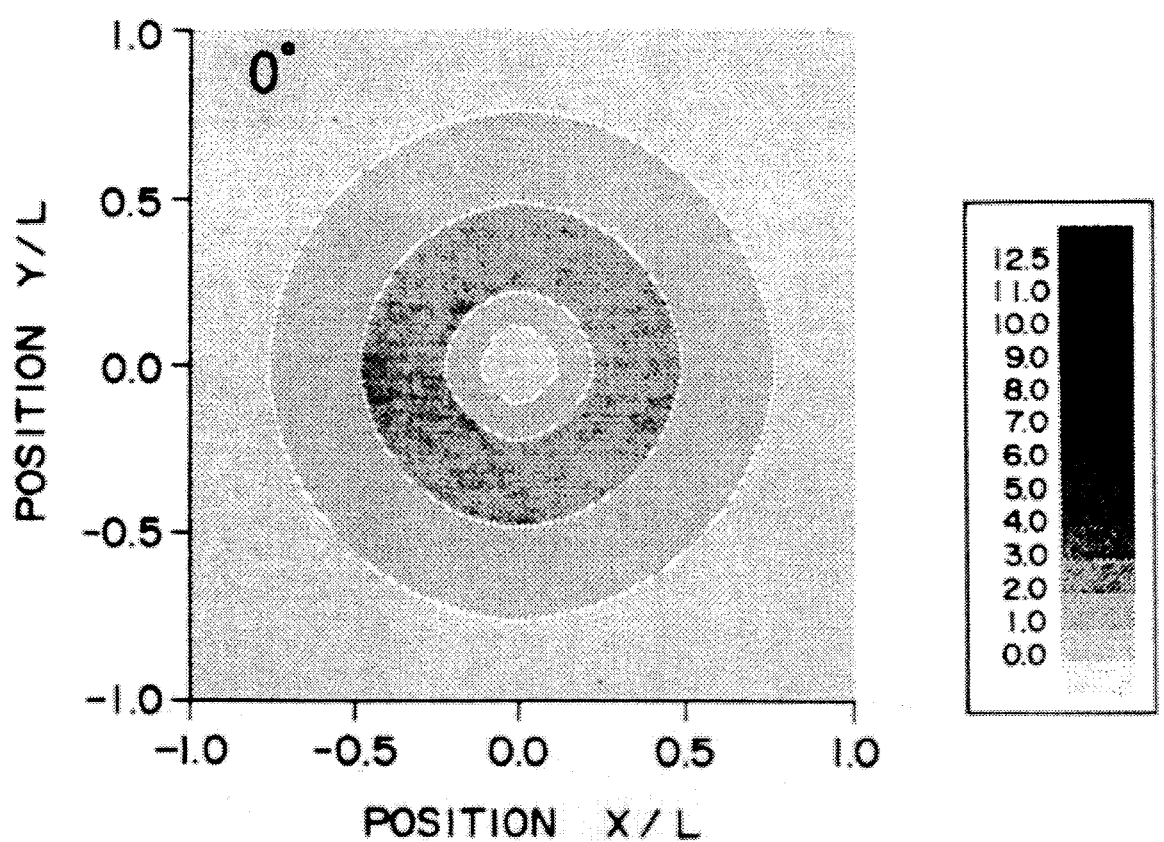
FIG. 11 is a photograph showing an XY-plane sensitivity distribution in case where the coil inclination angle $\Theta_T$ is set to 0°.
Figure 12:
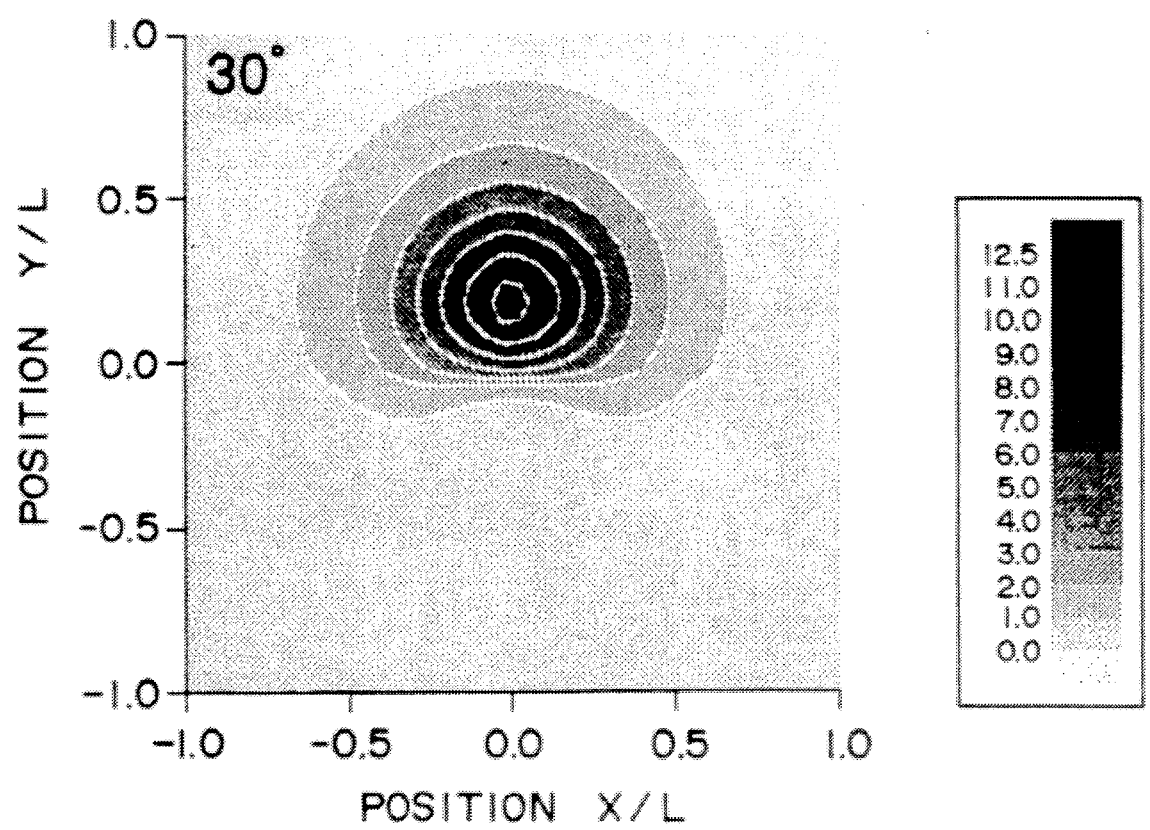
FIG. 12 is a photograph showing an XY-plane sensitivity distribution in case where the coil inclination angle $\Theta_T$ is set to 30°.
Figure 14:
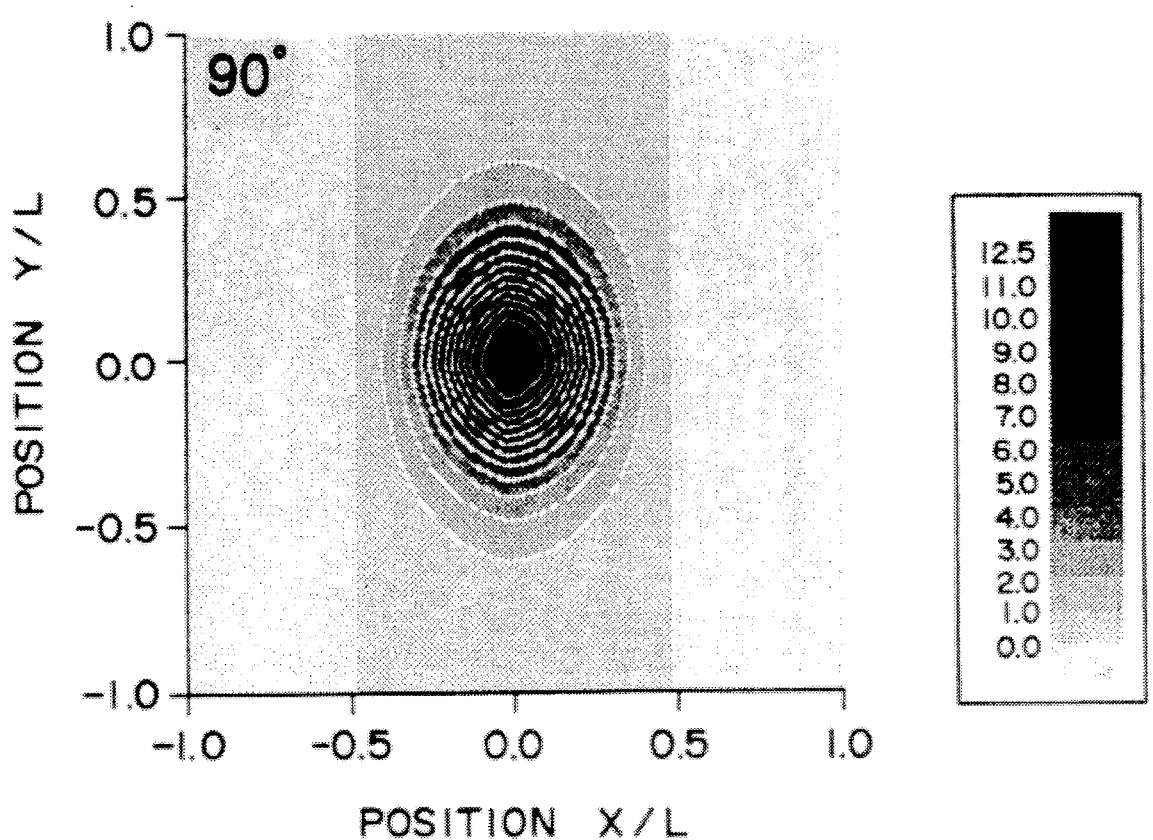
FIG. 14 is a photograph showing an XY-plane sensitivity distribution in case where the coil inclination angle $\Theta_T$ is set to 90°.
Figure 15:
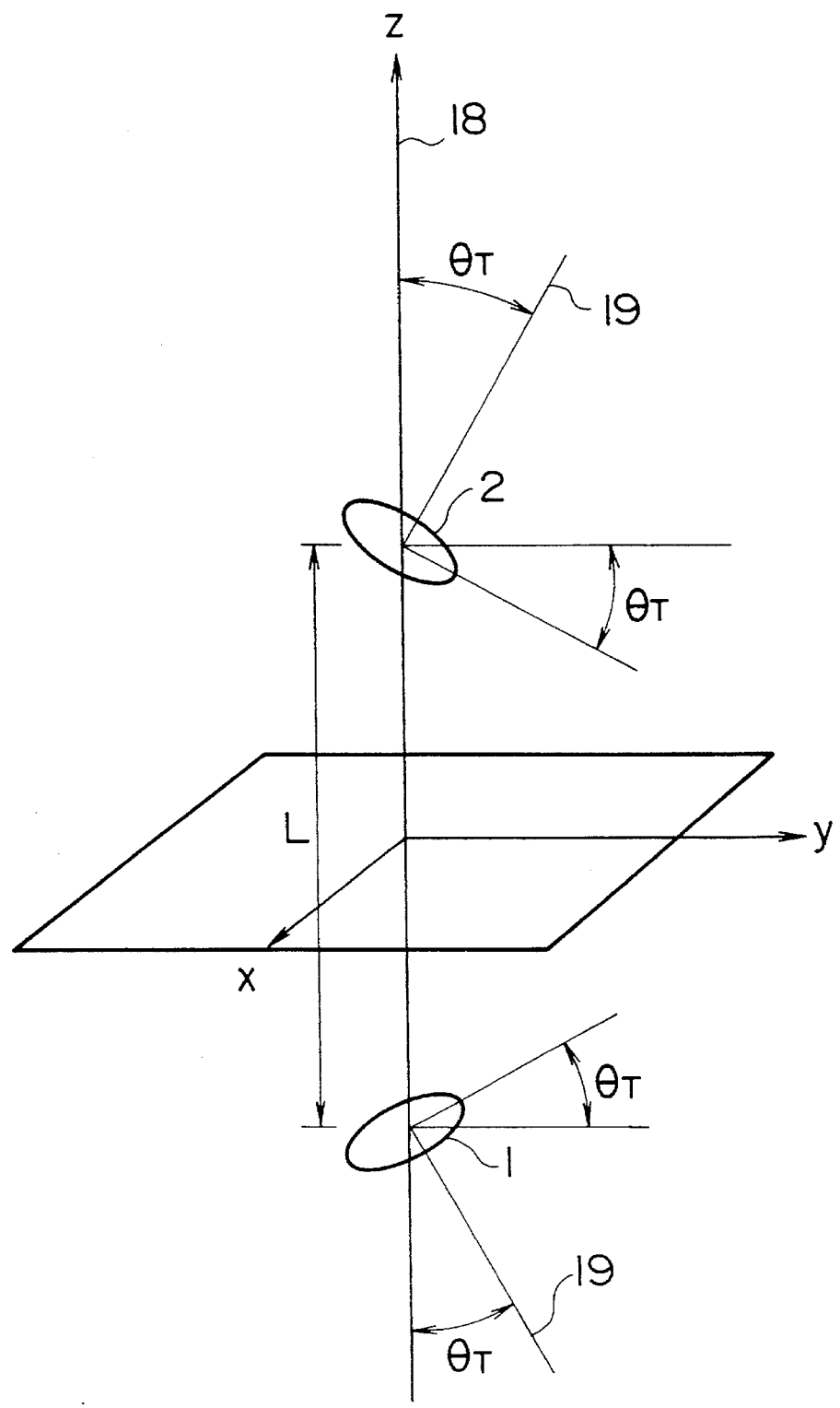
FIG. 15 is a view illustrating the direction and the plane in FIGS. 11 to 14.
Figure 16:
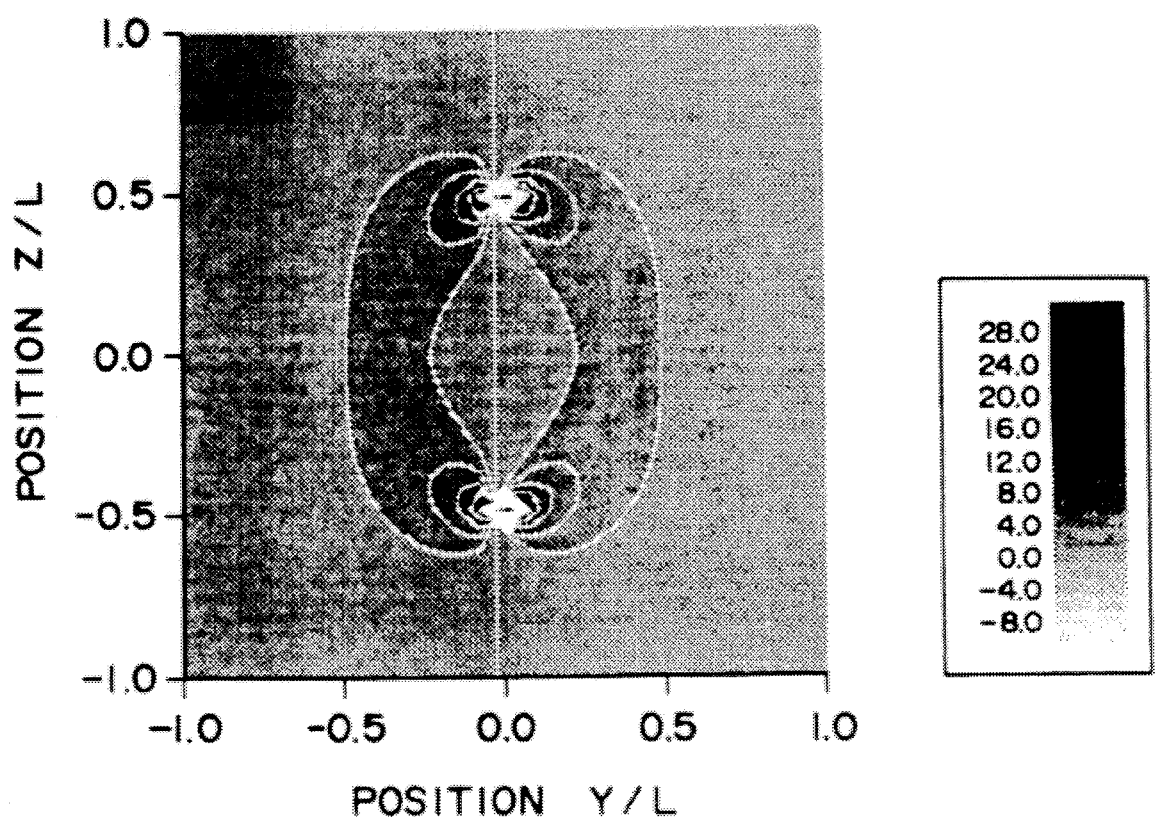
FIG. 16 is a photograph showing a YZ-plane sensitivity distribution in case where the coil inclination angle $\Theta_T$ is set to 0°.
Figure 17:
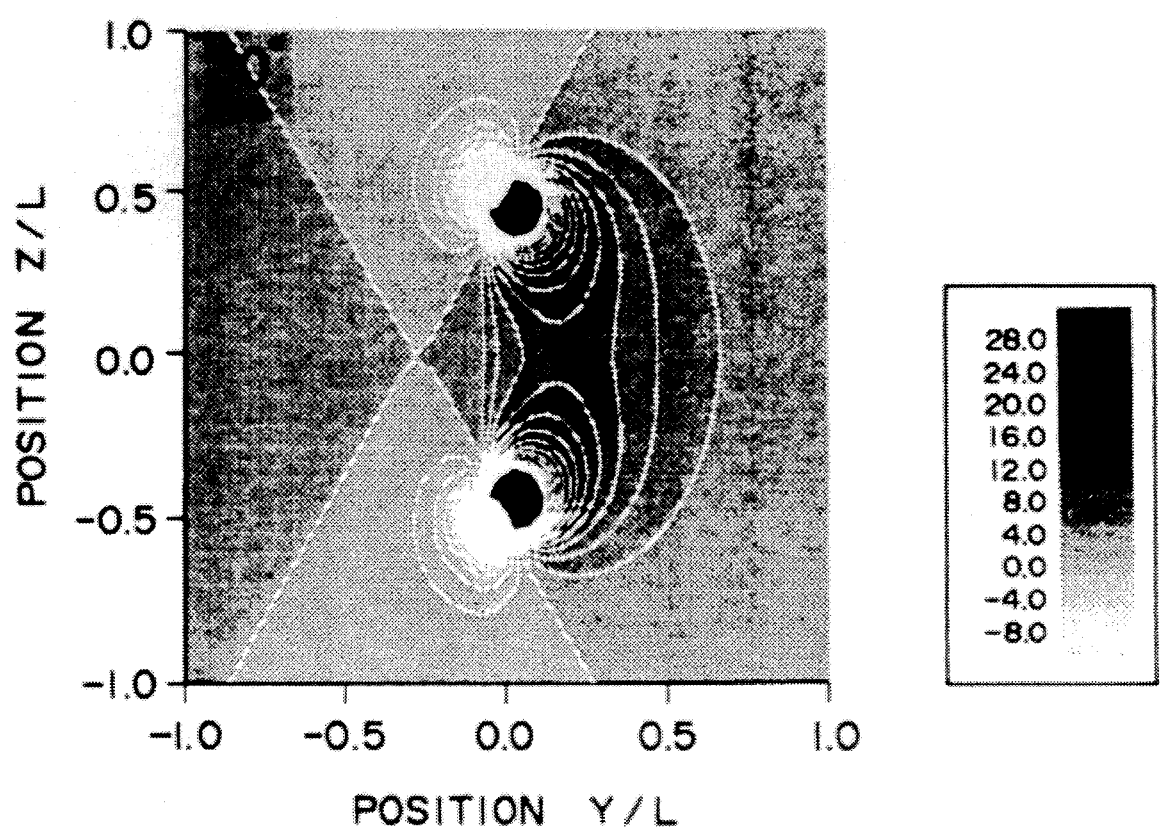
FIG. 17 is a photograph showing a YZ-plane sensitivity distribution in case where the coil inclination angle $\Theta_T$ is set to 30°.
Figure 18:
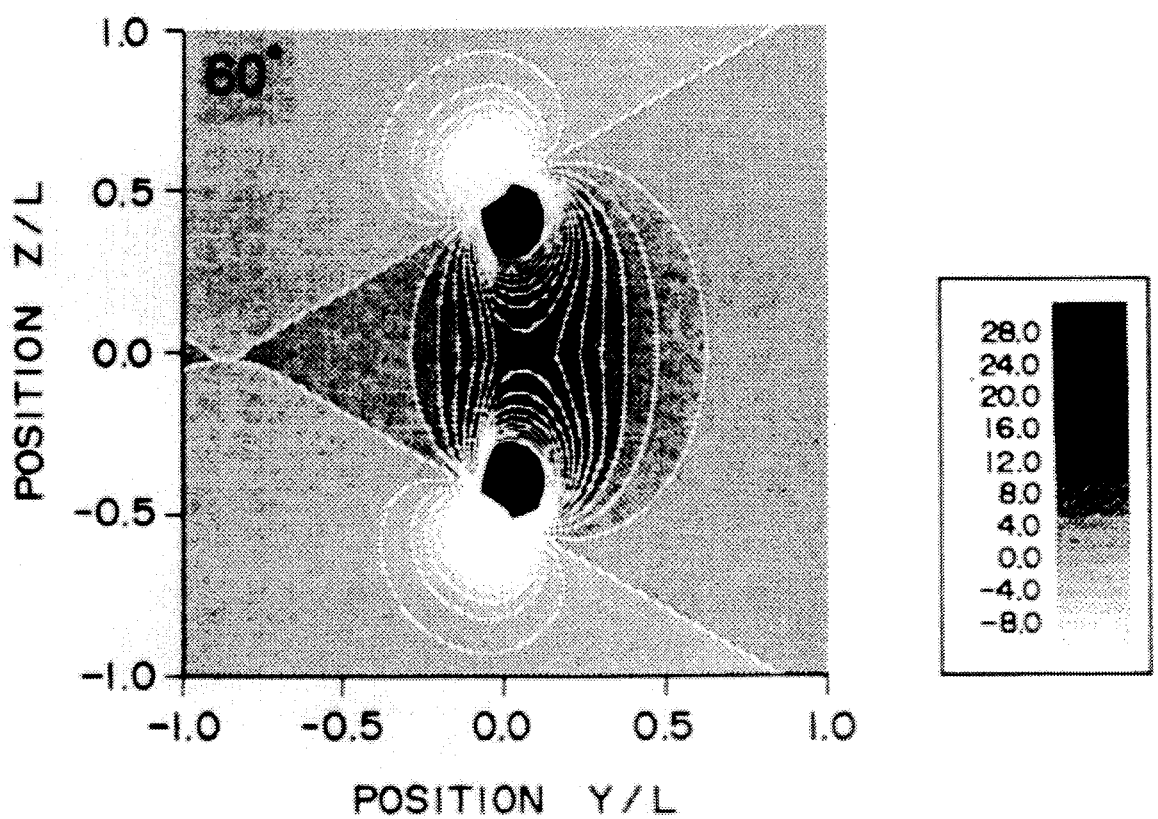
FIG. 18 is a photograph showing a YZ-plane sensitivity distribution in case where the coil inclination angle $\Theta_T$ is set to 60°.
Figure 19:
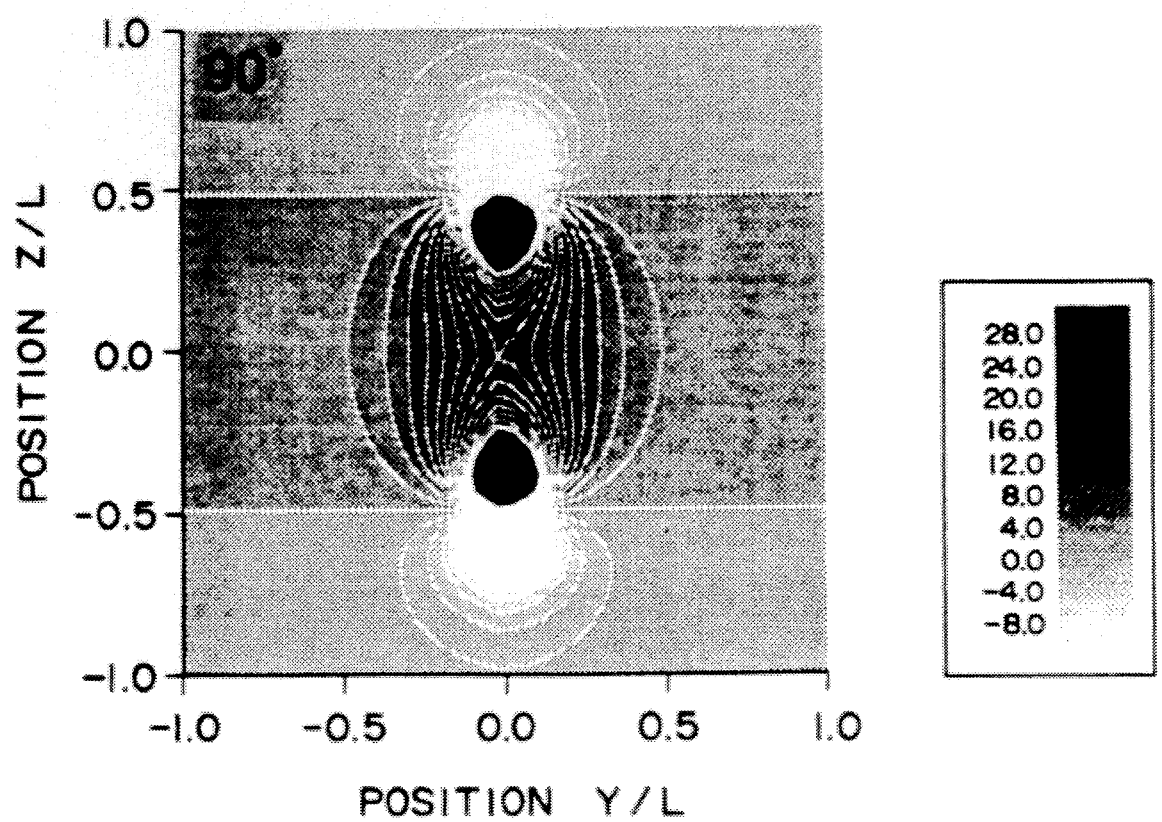
FIG. 19 is a photograph showing a YZ-plane sensitivity distribution in case where the coil inclination angle $\Theta_T$ is set to 90°.

FIGS. 9 and 10 show a third embodiment of the present invention. This embodiment concerns a method of and an apparatus for measuring the electric conductivity in a specific direction.

In this embodiment, at least one transmitting coil 1 and at least one receiving coil 2 are secured to the shaft 10 extending along the hole axis of a borehole 7 such that these coils are inclined (at an inclination angle $\Theta_T$ of desirably about 30°) so as to face each other. An alternating current is supplied from the transmitter 3 to the transmitting coil 1, and the amplitude and phase of the voltage induced across the receiving coil 2 are detected by the phase sensitive detector 4 for recording on a recorder 23. By rotating the shaft 10, it is possible to measure the electric conductivity in a specific direction with respect to the borehole 7.

What is claimed is:

1. A method of directional induction logging employing electromagnetic induction, comprising the steps of:

arranging at least one directional transmitting coil having an axis and at least one directional receiving coil having an axis in a borehole along an axis of the borehole such that a preselected angle between said bore axis and the respective axes of said coils is less than ninety degrees;

measuring the amplitude of a voltage induced in said at least one receiving coil; and measuring the phase difference between current supplied to said at least one transmitting coil and current induced in said at least one receiving coil;

whereby electrical conductivity of a formation around said borehole is measured in a preselected direction due to said angular arrangement of said coils.

2. A method of directional induction logging according to claim 1, wherein said transmitting and receiving coils are rotated in said borehole to measure preselected electrical parameters of a formation around said borehole.

3. A method of directional induction logging according to claims 1 or 2, comprising the steps of:

rotating said transmitting and receiving coils in the borehole to measure electrical conductivity continuously along the borehole axis, thus obtaining imaging reflecting electrical conductivity of formations around said borehole;

measuring the amplitude of a voltage induced in said at least one receiving coil; and measuring the phase difference between current supplied to said at least one transmitting coil and current induced in said at least one receiving coil.

4. An apparatus for directional induction logging, comprising at least one directional transmitting coil having an axis and at least one directional receiving coil having an axis which are disposed in a borehole along an axis of the borehole;

said coils being arranged with respect to said axis of said borehole at a preselected angle where the respective axes of said coils are disposed at less than ninety degrees with respect to said axis of said borehole;

whereby the amplitude of a voltage induced in said at least one receiving coil being measured; and whereby the phase difference between current supplied to said at least one transmitting coil and current induced in said at least one receiving coil being measured;

whereby electrical conductivity of a formation around said borehole is measured in a preselected direction due to said angular arrangement of said coils.

5. An apparatus for directional induction logging according to claim 4, further comprising a drive device for rotating said transmitting and receiving coils in said borehole to measure electrical conductivity distribution of a formation around said borehole.

6. An apparatus for directional induction logging according to claims 4 or 5, further comprising a drive device for rotating said transmitting and receiving coils in the borehole to measure electrical conductivity continuously along the borehole axis, thus obtaining imaging reflecting the electrical conductivity of formations around said borehole;

whereby an imaging is obtained by measuring the amplitude of a voltage induced in said at least one receiving coil, and by measuring the phase difference between current supplied to said at least one transmitting coil and current induced in said at least one receiving coil.

* * * * *